United States Patent
Simoff et al.

(10) Patent No.: US 10,655,034 B2
(45) Date of Patent: May 19, 2020

(54) UV-CURABLE SILSESQUIOXANE-CONTAINING WRITE-THROUGH OPTICAL FIBER COATINGS FOR FABRICATION OF OPTICAL FIBER BRAGG GRATINGS, AND FIBERS MADE THEREFROM

(71) Applicant: OFS Fitel, LLC, Norcross, GA (US)

(72) Inventors: Debra A Simoff, Simsbury, CT (US); Kenneth S Feder, Murray Hill, NJ (US); Yaowen Li, Princeton, NJ (US); Jacob Wrubel, Storrs Mansfield, CT (US); Kenichi Suyama, Chiba (JP); Mei Wen, Longmeadow, MA (US)

(73) Assignee: OFS FITEL, LLC, Norcross, CA (US)

( * ) Notice: Subject to any disclaimer, the term of this patent is extended or adjusted under 35 U.S.C. 154(b) by 292 days.

(21) Appl. No.: 15/326,525

(22) PCT Filed: Jul. 28, 2015

(86) PCT No.: PCT/US2015/042486
§ 371 (c)(1),
(2) Date: Jan. 16, 2017

(87) PCT Pub. No.: WO2016/018918
PCT Pub. Date: Feb. 4, 2016

(65) Prior Publication Data
US 2017/0204290 A1   Jul. 20, 2017

Related U.S. Application Data

(60) Provisional application No. 62/030,263, filed on Jul. 29, 2014.

(51) Int. Cl.

| | | |
|---|---|---|
| *C09D 183/06* | (2006.01) | |
| *C08G 77/04* | (2006.01) | |
| *C08G 77/14* | (2006.01) | |
| *C08G 77/20* | (2006.01) | |
| *C09D 183/04* | (2006.01) | |
| *B05D 3/06* | (2006.01) | |
| *C03C 23/00* | (2006.01) | |
| *C03C 25/106* | (2018.01) | |

(52) U.S. Cl.
CPC .......... *C09D 183/06* (2013.01); *B05D 3/067* (2013.01); *C03C 23/0025* (2013.01); *C03C 25/106* (2013.01); *C08G 77/045* (2013.01); *C08G 77/14* (2013.01); *C08G 77/20* (2013.01); *C09D 183/04* (2013.01); *C08L 2312/06* (2013.01)

(58) Field of Classification Search
CPC .................................................. C08G 77/20
See application file for complete search history.

(56) References Cited

U.S. PATENT DOCUMENTS

| | | |
|---|---|---|
| 4,835,057 A | 5/1989 | Bagley et al. |
| 5,620,495 A | 4/1997 | Aspell et al. |
| 5,745,615 A | 4/1998 | Atkins et al. |
| 5,773,486 A | 6/1998 | Chandross et al. |
| 5,962,067 A | 10/1999 | Bautista et al. |
| 5,989,627 A | 11/1999 | Blyler, Jr. et al. |
| 6,204,304 B1 | 3/2001 | Houlihan et al. |
| 6,240,224 B1 | 5/2001 | Reekie et al. |
| 6,396,983 B1 | 5/2002 | Atkins et al. |
| 6,652,975 B2 | 11/2003 | Kuck et al. |
| 7,162,123 B2 | 1/2007 | Andre et al. |
| 7,257,303 B2 | 8/2007 | Walker, Jr. et al. |
| 7,385,017 B2 | 6/2008 | Saito et al. |
| 7,496,255 B2 | 2/2009 | Cronk et al. |
| 9,080,077 B2 | 7/2015 | De Groot, Jr. et al. |
| 9,353,001 B2 | 5/2016 | Hokansson et al. |
| 2003/0199603 A1 | 10/2003 | Walker et al. |
| 2005/0244658 A1 | 11/2005 | Bae et al. |
| 2006/0052567 A1* | 3/2006 | Saito ............... C08F 230/08 528/25 |
| 2009/0256287 A1 | 10/2009 | Fu et al. |

(Continued)

FOREIGN PATENT DOCUMENTS

| | | | |
|---|---|---|---|
| JP | 04 031806 | * | 2/1992 |
| JP | H0431806 A | | 2/1992 |
| JP | 2008 233273 | * | 10/2008 |

OTHER PUBLICATIONS

JP 04 031806 machine translation (1992).*
JP 2008 233273 machine translation (2008).*
Bartelt et al.; "Single-pulse fiber Bragg gratings and specific coatings for use at elevated temperatures"; Applied Optics, vol. 46, No. 17; Jun. 10, 2007, pp. 3417-3424.
Betz et al.; "Fiberoptic Smart Sensing of Component Deformations in Adaptive Wings"; ICAS Congress; 2000, 10 pages.
Chao et al.; "Grating writing through fibre coating at 244 and 248nm"; Electronics Letters; vol. 35, No. 11; May 27, 1999, 924-926.

(Continued)

*Primary Examiner* — Kuo Liang Peng
(74) *Attorney, Agent, or Firm* — David E. Rodrigues; Cantor Colburn, LLP

(57) ABSTRACT

Disclosed herein is a coating composition comprising a silsesquioxane component having one or more reactive functional groups that render it curable using ultraviolet radiation; where the one or more reactive functional groups are selected from the group consisting of an acrylate, a vinyl ether, or an epoxy; and optionally, a co-reactive non-silsesquioxane monomer and/or an oligomer having one or more reactive functional groups that are curable using ultraviolet radiation and are selected from the group consisting of free radically curable acrylates, cationically curable epoxies, and cationically curable vinyl ethers; where the coating composition is disposed and cured on an optical article; where the optical article is at least one of an optical fiber or an optical planar waveguide; and where the average functionality of the composition is greater than one.

26 Claims, 9 Drawing Sheets

(56) References Cited

U.S. PATENT DOCUMENTS

2014/0135413 A1    5/2014  Yoo et al.

OTHER PUBLICATIONS

Claesson et al.; "UV-Transparent Coatings for Optical Fiber"; International Wire & Cable Symposium Proceedings; 1997, pp. 82-85.

Crivello et al.; "Synthesis and Photoinitiated Cationic Polymerization of Monomers Containing the Silsesquioxane Core"; In Silicones and Silicone-Modified Materials, ACS Symposium Series; American Chemical Society: Washington, DC; 2000, pp. 284-295.

De Girolamo et al.; "Epoxy silsesquioxane resists for UV nanoimprint lithography"; J. Vac. Sci. Technol. B 26(6), Nov./Dec. 2008; pp. 2271-2275.

Dworak et al.; "Synthesis of Cycloaliphatic Substituted Silane Monomers and Polysiloxanes for Photocuring"; Macromolecules, 37; 2004, pp. 9402-9417.

Espindola et al.; "40 dB Fiber Bragg Grating Written Through the Fiber Coating at 257 nm"; Bragg Gratings, Photosensitivity, and Poling in Glass Fibers and Waveguides: Applications and Fundamentals Topical Meeting, Post-deadline paper PD2; 1997, 6 pages.

Espindola et al.; "Fiber Bragg Gratings Written Through a Fiber Coating"; Tech. Dig, PD4-1; OFS/OFC; 1997, 4 pages.

Espindola et al.; "Highly Reflective Fiber Bragg Gratings Written Through a Vinyl Ether Fiber Coating"; IEEE Photonics Technology Letters, vol. 11, No. 7, Jul. 1999, pp. 833-835.

Fritz et al; "Photodefinable Epoxycyclohexyl Polyhedral Oligomeric Silsesquioxane"; Journal of Electronic Materials, vol. 39, No. 2; 2010, pp. 149-156.

International Search Report for International Application No. PCT/US2015/042486, International Filing Date Jul. 28, 2015, dated Dec. 22, 2015, 9 pages.

Masson et al.; "UV-curable formulations for UV-transparent optical fiber coatings I. Acrylic resins"; Progress in Organic Coatings 49; 2004, pp. 1-12.

Matejec et al.; "Development of organically modified polysiloxanes for coating optical fibers and their sensitivity to gases and solvents"; Sensors and Actuators B 38-39; 1997, pp. 438-442.

Mihailov et al.; "Bragg grating writing through the polyimide coating of high NA optical fibres with femtosecond IR radiation"; Optics Communications 281; 2008, pp. 5344-5348.

Mihailov et al.; "Through-the-jacket inscription of fiber Bragg gratings using femtosecond infrared radiation for sensor applications"; Proc. of SPIE vol. 7316, Fiber Optic Sensors and Applications VI, 73160B; 2009, 13 pages.

Rose et al.; "Multifunctional Acrylate Alkoxysilanes for Polymeric Materials"; Mat. Res. Soc. Symp. Proc., vol. 271; 1992, pp. 731-736.

Rose et al.; "Organopolysiloxanes as Chemically Sensitive Coatings for Optical Fibers"; Journal of Sol-Gel Science and Technology 13; 1998, pp. 729-733.

Sellinger et al.; "Silsesquioxanes as Synthetic Platforms. 3. Photocurable, Liquid Epoxides as Inorganic/Organic Hybrid Precursors"; Chem. Mater., 8; 1996, pp. 1592-1593.

Simoff et al.; "Coatings Having Enhanced UV Transparency for the Fabrication of Optical Fiber Gratings"; International Wire & Cable Symposium Proceedings; 1997, pp. 86-93.

Simoff et al.; "Cure Studies With Novel Photoinitiators"; RadTech'98 Conf. Proc.; 1998, 7 pages.

Simoff et al.; "UV-Transparent Coatings for the Fabrication of Optical Fiber Gratings"; Abstracts of Papers of the American Chemical Society, vol. 218; 1999, 6 pages.

Westbrook et al.; "Integrated optical fiber shape sensor modules based on twisted multicore fiber grating arrays"; Proc. of SPIE vol. 8938, Optical Fibers and Sensors for Medical Diagnostics and Treatment Applications XIV, 89380H, 2014, 7 pages.

Wojcik et al.; "Hybrid Glass Coatings for Optical Fibers. Preliminary Results of Coating Performance on Silica Fibers."; Optical Fibers: Technology, Proc. of SPIE vol. 5951, 595108; 2005, 8 pages.

Wojcik et al.; "Novel Hybrid Glass Protective Coatings for High Temperature Applications"; International Wire & Cable Symposium; 2005, pp. 368-372.

Wojcik et al.;"Hybrid glass coatings for optical fibers:effect of coating thickness on strength&dynamic fatigue characteristics of silica fibers";Proc.of SPIE vol. 6193,61930T;Reliability of Optical Fiber Comps,Devices,Systems,& Networks III;2006,6 pages.

Written Opinion for International Application No. PCT/US2015/042486, International Filing Date Jul. 28, 2015, dated Dec. 22, 2015, 6 pages.

* cited by examiner

US 10,655,034 B2

UV-CURABLE SILSESQUIOXANE-CONTAINING WRITE-THROUGH OPTICAL FIBER COATINGS FOR FABRICATION OF OPTICAL FIBER BRAGG GRATINGS, AND FIBERS MADE THEREFROM

CROSS REFERENCE TO RELATED APPLICATIONS

This application is a National Stage application of PCT/US2015/042486, filed Jul. 28, 2015, which claims the benefit of U.S. Provisional Application No. 62/030,263, filed Jul. 29, 2014, both of which are incorporated by reference in their entirety herein.

BACKGROUND

Disclosed herein are ultraviolet (UV) curable silsesquioxane-containing write-through optical fiber coatings for fabrication of optical fiber Bragg gratings and the fibers made therefrom.

Fiber Bragg grating (FBG) arrays are seeing an increased demand for a variety of sensing applications. Improvements are needed with respect to a) coating heat resistance in emerging markets, e.g., geophysical applications (particularly for temperature and strain sensing in oil exploration) and b) FBG production efficiency, especially for shape sensor fibers that are produced by single-shot (single laser pulse) writing techniques. FBG fabrication using a "strip/write/recoat" process is not efficient for high-volume arrays, being time consuming and also subjecting the stripped fiber to an increased probability of breakage thereby reducing yields and manufacturing efficiency. In such a process, the polymer coating is removed from the glass substrate of the fiber, followed by laser inscription of the FBG into the glass core, and subsequent recoating to restore mechanical robustness afforded by a protective polymer layer. In those cases, removal of the coating may be necessitated by the relative opacity of certain types of optical fiber coatings to the FBG writing wavelength. Draw tower fabrication (writing FBGs during fiber drawing, before the glass fiber is coated) suffers from difficulties involving decoupling the writing process from the fiber drawing process.

Previously, certain "write-through" coating methods were devised that allow inscription of gratings by side-writing with UV lasers through the fiber coating. This was accomplished by tailoring the coating to have increased UV transparency at the writing wavelength. However, such coatings to date have either not been UV-curable (presenting difficulties with solvent removal or thermal curing) or those that are UV-curable have provided only modest levels of robustness with respect to scuff resistance and thermal stability.

It has been found that fabrication of certain types of FBGs is particularly sensitive to the surface quality of the coating, as for example in shape sensor fiber (SSF) arrays where the fibers contain multiple twisted glass cores and where each grating is inscribed simultaneously into the multiple cores using only a single pulse. Such a single-pulse process is in contrast to FBG inscription processes that use a series of laser pulses or steady UV irradiation, where the FBG quality and intensity can optionally be monitored and adjusted using real-time feedback over a timeframe of multiple seconds or even minutes. Other previously developed UV-curable coatings have shown susceptibility to scratching, wrinkling, or to attraction to dust and environmental debris onto the coating surface, by virtue of having limited hardness and/or excess surface tack associated with relatively low cure speed. Improved write-through coatings are needed with respect to these attributes, particularly for producing single-pulse FBGs.

SUMMARY

Disclosed herein is a coating composition comprising a silsesquioxane component having one or more reactive functional groups that render it curable using ultraviolet radiation; where the one or more reactive functional groups are selected from the group consisting of an acrylate, a vinyl ether, or an epoxy; and optionally, a co-reactive non-silsesquioxane monomer and/or an oligomer having one or more reactive functional groups that are curable using ultraviolet radiation and are selected from the group consisting of free radically curable acrylates, cationically curable epoxies, and cationically curable vinyl ethers; where the coating composition is disposed and cured on an optical article; where the optical article is at least one of an optical fiber or an optical planar waveguide; and where the average functionality of the composition is greater than one.

Disclosed herein too is a coating comprising the reaction product of a coating composition comprising a silsesquioxane component having one or more reactive functional groups that render it curable using ultraviolet radiation; where the one or more reactive functional groups are selected from the group consisting of an acrylate, a vinyl ether, or an epoxy; and optionally, a co-reactive non-silsesquioxane monomer and/or an oligomer having one or more reactive functional groups that are curable using ultraviolet radiation and are selected from the group consisting of free radically curable acrylates, cationically curable epoxies, and cationically curable vinyl ethers; where the coating composition is disposed and cured on an optical article; where the optical article is at least one of an optical fiber or an optical planar waveguide; and where the average functionality of the coating composition prior to curing is greater than one.

Disclosed herein too is a method comprising disposing onto an optical fiber or onto an optical waveguide a composition comprising a silsesquioxane component having one or more reactive functional groups that render it curable using ultraviolet radiation; where the one or more reactive functional groups are selected from the group consisting of an acrylate, a vinyl ether, or an epoxy; and optionally, a co-reactive non-silsesquioxane monomer and/or an oligomer having one or more reactive functional groups that are curable using ultraviolet radiation and are selected from the group consisting of free radically curable acrylates, cationically curable epoxies, and cationically curable vinyl ethers; where the coating composition is disposed and cured on an optical fiber; where the average functionality of the silsesquioxane component and the co-reactive non-silsesquioxane monomer prior to curing is greater than one; and curing the composition using ultraviolet radiation to produce a coating that displays an optical absorbance capability of less than 0.04 per micrometer at an ultraviolet writing wavelength of 248 nm.

DETAILED DESCRIPTION

Figure 1:
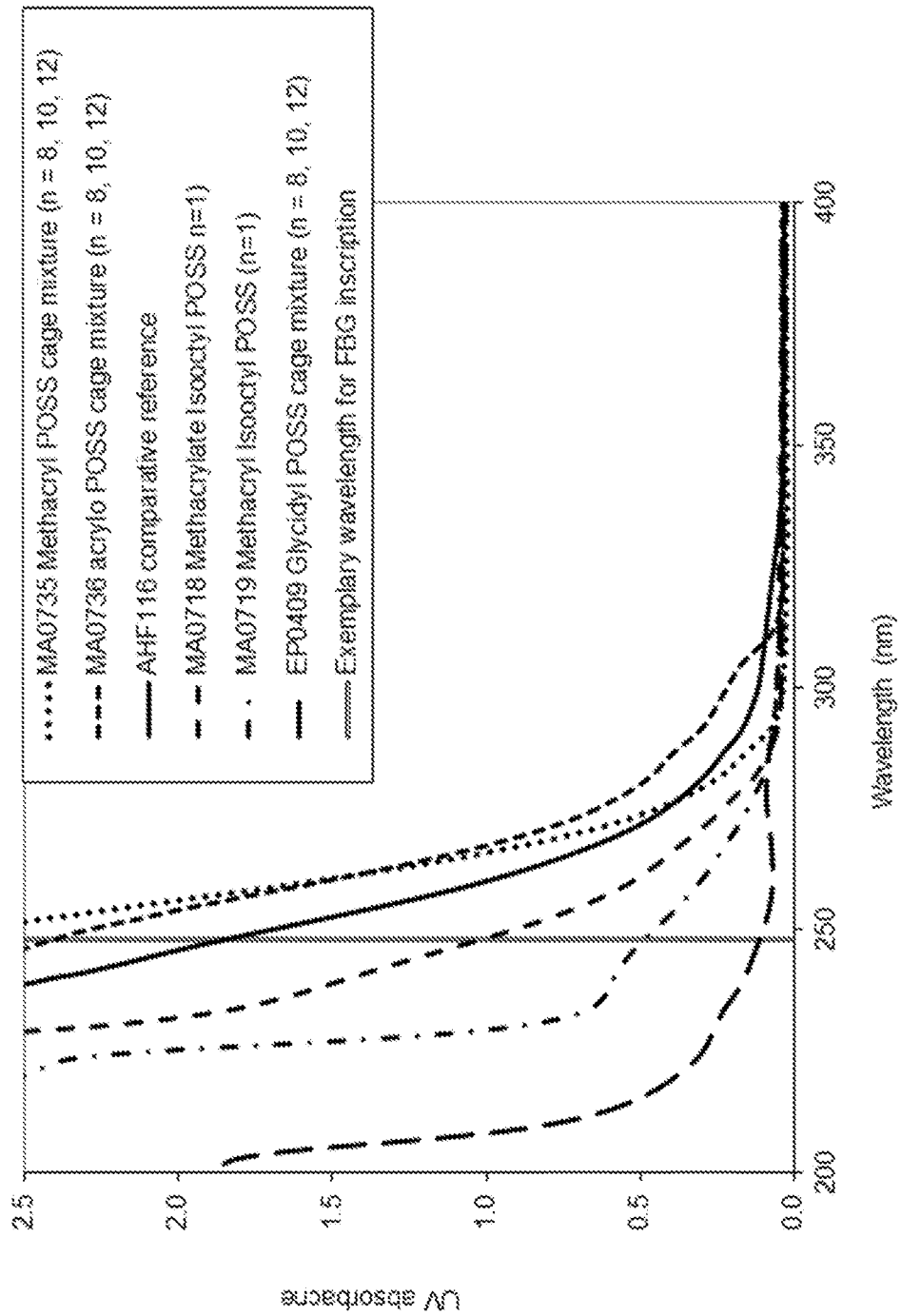
FIG. 1 shows UV absorbance of selected commercial liquid UV-curable cage-type silsesquioxane components in comparison with the UV absorbance of a comparative non-silsesquioxane write-through coating, AHF116, where the silsesquioxane materials did not contain photoinitiator and where all sample thicknesses were nominally 25 micrometers, as controlled using PTFE spacers sandwiched between quartz disks.

Disclosed herein are ultraviolet (UV)-curable optical fiber coating compositions (hereinafter coating compositions) that contain silsesquioxane moieties. The coating compositions are disposed onto glass optical fibers or onto optical planar waveguides that can, after crosslinking of the coating, have UV-induced gratings written into one or more cores within the glass without removing the polymer coating, thus permitting the high speed manufacturing of mechanically robust fiber gratings. The silsesquioxane moieties are functionalized with reactive groups so as to render them UV-curable. Each coating composition may optionally comprise additional non-silsesquioxane monomers and oligomers in addition to the UV-curable silsesquioxane, causing the composition to have an average combined functionality greater than 1, preferably greater than 2, which renders it crosslinkable. The oligomers and monomers have reactive functional groups that enable UV curing. When cured, each coating composition is substantially devoid of aromatic moieties and other conjugated carbon double bonds that absorb UV light.

The compositions are advantageous in that they represent an improvement over silsesquioxane components that use solvent processing and thermal curing. The coatings have sufficiently low ultraviolet absorbance after being cured to enable write-through fabrication of fiber Bragg gratings at a coating thickness of 5 to 82.5 micrometers ($\mu m$), preferably 30 to 40 micrometers, where such thickness imparts a substantial level of mechanical protection to the glass fiber along with an optical absorbance capability of less than $0.044/\mu m$, preferably less than or equal to $0.03/\mu m$, and most preferably less than $0.02/\mu m$ at a 248 nm UV writing wavelength. The coatings are characterized by having superior performance in at least one of the following areas: higher hardness, higher elastic modulus, higher UV transparency, and/or higher thermal stability in comparison with other previously disclosed UV-curable write-through coatings that do not incorporate silsesquioxanes.

Silsesquioxanes have the structure $(RSiO_{1.5})_n$ wherein R represents one or more types of substituents, typically organic in nature. An alternate designation is "T-resin," indicating that there are three (tri-substituted) oxygen atoms substituting the silicon. These molecules have rigid, thermally stable silicon-oxygen frameworks whose structures and characteristics are intermediate between those of silica glass $(SiO_2)_n$ and silicone polymer $(R_2SiO)_n$. The silsesquioxane moieties in the coating composition may be selected from among various structural types: polyhedral cage, ladder, random, or a mixture thereof, as shown in formulas 1-3 below.

Formula (1) shows a random silsesquioxane moiety

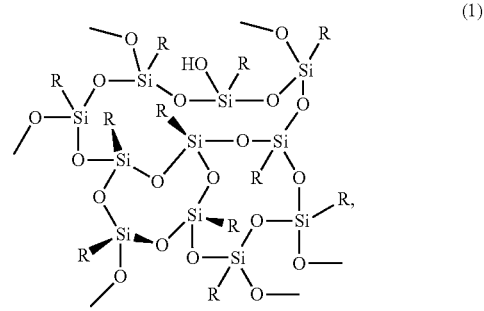

while Formula (2) depicts ladder silsesquioxanes:

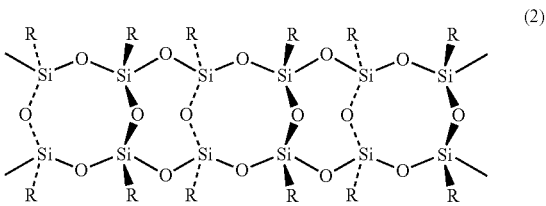

and Formula (3) depicts complete and incomplete (partial) polyhedral cage silsesquioxanes.

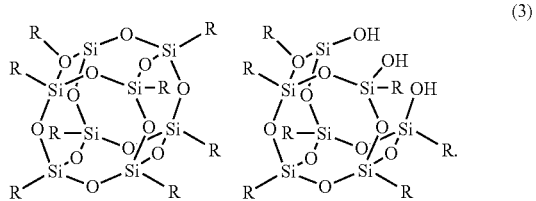

(3)

The silsesquioxane moieties confer relatively high hardness and heat resistance together with high UV transparency, while incorporation of UV-reactive functional groups renders the silsesquioxanes UV-curable to facilitate the optical fiber manufacturing process. The coating composition has a viscosity of 10 to 100,000 centipoise (cP), preferably 1,000 to 40,000, and more preferably 2,000 to 5,000 cP. The coating contains a low level of photoinitiator and may optionally include one or more other beneficial additives (e.g., silane adhesion promoters, antioxidants, flow aids, slickness agents), as long as these allow sufficient UV transparency for the capability of writing FBGs into the fiber through the coating.

As mentioned above, silsesquioxanes can have a cage-like structure. The structure of a cage-type silsesquioxane is often in the form of a cube, hexagonal prism, octagonal prism, decagonal prism, a dodecagonal prism, or even opened cage-like structure. Various cage-type silsesquioxanes are sold by Hybrid Plastics under the POSS tradename where they are described as being polyhedral oligomeric silsesquioxanes and have the generic formula $(RSiO_{1.5})_n$ wherein R is typically an organic or an inorganic moiety and n is 6, 8, 10, 12, or higher. As with all silsesquioxanes, these molecules have rigid, thermally stable silicon-oxygen frameworks with an oxygen to silicon ratio of 1.5, and most contain covalently-bound organic (and sometimes inorganic) groups that provide an outer layer comprising, for example, hydrocarbons (e.g., vinyl, isooctyl, cyclohexyl, cyclopentyl, isobutyl, or other hydrocarbons), as well as functional groups such as ester, vinyl, epoxy, acrylate, hydroxyl, or other functional groups. An $Si_8$ (where n=8) POSS structure is illustrated below in Formula (4):

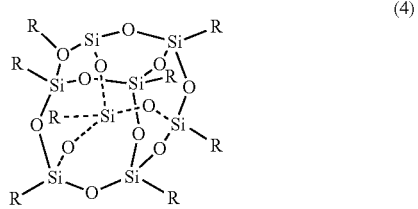

(4)

Through variation of the R group on the silicon atom, a variety of functional groups can be placed off the corner of the POSS framework. Each R group can be a reactive group that can participate in polymerization to cure the coating, or alternatively, it can be a non-reactive group that can facilitate chemical compatibilization with other species present in the composition. In addition to their role in enabling polymerization or compatibilization, the various types of R groups can be selected or tailored to impart other desired attributes, such as flexibility or stiffness, thermal stability, chemical resistance, cure speed, refractive index, and so on. In an exemplary embodiment, the R group on the silicon atom is a reactive functional group that can participate in UV-initiated polymerization and includes an acrylate, a methacrylate, a vinyl, a vinyl ether, a thiol or an epoxide, a hydroxyl, or combinations thereof.

Other potential R groups include non-reactive groups such as a $C_1$-$C_{24}$ straight, branched, or cyclic alkyls, aliphatic or cycloaliphatic ethers or polyethers, aliphatic or cycloaliphatic esters or polyesters, aliphatic or cycloaliphatic siloxanes or polysiloxanes, aliphatic or cycloaliphatic carbonates or polycarbonates, aliphatic or cycloaliphatic fluorocarbons or other halocarbons, aliphatic or cycloaliphatic urethane ethers, urethane esters, or urethane carbonates.

In another exemplary embodiment, the R group is a low molecular weight homopolymer or copolymer that has a reactive species that is either located along the backbone of or alternatively located as a pendant group off of the backbone. Examples of such low molecular weight oligomers are $C_1$-$C_{24}$ straight, branched, or cyclic alkyls, aliphatic or cycloaliphatic ethers or polyethers, aliphatic or cycloaliphatic esters or polyesters, aliphatic or cycloaliphatic siloxanes or polysiloxanes, aliphatic or cycloaliphatic carbonates or polycarbonates, aliphatic or cycloaliphatic fluorocarbons or other halocarbons, aliphatic or cycloaliphatic urethane ethers, urethane esters, or urethane carbonates. The number of reactive functional groups R in a polyhedral or "cage type" oligomeric silsesquioxane can vary from 1 to 12, preferably 1 to 8, 2 to 6 or 3 to 5. The R groups that do not contain reactive functional groups are non-reactive groups.

Another way of detailing the aforementioned structure of the POSS cage-type silsesquioxane moiety includes the general formula $R_{n-m}T_nY_m$ where R is a reactive functional species that can enable UV-induced polymerization of the coating; n is 6, 8, 10, 12 or higher; m is 1 to n; T is $SiO_{1.5}$; and Y represents the non-reactive species that may facilitate chemical compatibilization with other species present in the composition. In an exemplary embodiment, the various R groups on the silane can be the same or different and are reactive functional groups that can enable polymerization and/or crosslinking and includes an acrylate, a methacrylate, a vinyl, a vinyl ether, a thiol or an epoxide. The Y groups include non-reactive groups such as a $C_1$-$C_{24}$ straight, branched, or cyclic alkyls, aliphatic or cycloaliphatic ethers or polyethers, aliphatic or cycloaliphatic esters or polyesters, aliphatic or cycloaliphatic siloxanes or polysiloxanes, aliphatic or cycloaliphatic carbonates or polycarbonates, aliphatic or cycloaliphatic fluorocarbons or other halocarbons, aliphatic or cycloaliphatic urethane ethers, urethane esters, or urethane carbonates. In another exemplary embodiment, the R group is a low molecular weight homopolymer or copolymer that has a reactive species that is either located along the backbone of or alternatively located as a pendant group located off of the backbone.

In another embodiment, the R group contains 2 or more reactive functional groups, 3 or more reactive functional groups or 4 or more reactive functional groups. Di- and tri-acrylated groups are examples of reactive functional groups that enable UV-induced polymerization of the coating.

Exemplary POSS silsesquioxane moieties are POSS silsesquioxanes functionalized with acrylate and methacrylate functionalities (e.g., MA0701—acryloisobutyl POSS, MA0702—methacrylisobutyl POSS, MA0703—methacrylate cyclohexyl POSS, MA0706—methacrylate isobutyl POSS, MA0716—methacrylate ethyl POSS, MA0717—methacrylethyl POSS, MA0718—methacrylate isooctyl POSS, MA0719—methacrylisooctyl POSS, MA0735—methacryl POSS cage mixture, MA0736—acrylo POSS cage mixture, or the like, or a combination thereof), POSS silsesquioxanes functionalized with epoxy functionalities (e.g., EP0402—epoxycyclohexylisobutyl POSS, EP0408—epoxycyclohexyl POSS cage mixture, EP0409—glycidyl POSS cage mixture, EP0417—glycidylethyl POSS, EP0418—glycidylisobutyl POSS, EP0419—glycidylisooctyl POSS, EP0423—triglycidylisobutyl POSS, EP0430—octaepoxycyclohexyl dimethylsilyl POSS, EP0435—octaglycidyldimethylsilyl POSS or the like, or a combination thereof), POSS silsesquioxanes functionalized with thiol functionalities (TH1550—mercaptopropylisobutyl POSS, TH1555—mercaptopropylisooctyl POSS, or the like, or a combination thereof), isobutyl acrylate, difunctional heterocage, isooctyl acrylate, difunctional heterocage, or a combination thereof. All of the foregoing POSS moieties are commercially available from Hybrid Plastics. It is desirable for formulation of coatings that the components have liquid form at room temperature, although this is not required, as long as the components can be melted, dissolved through blending, or otherwise liquefied prior to application onto an optical fiber. POSS silsesquioxanes that are liquids or oils rather than solids (powders or waxes) include MA0718, MA0719, MA0735, MA0736, EP0408, EP0409, EP0423, EP0435, and TH1555.

Other exemplary UV-curable silsesquioxanes include members of the SQ Series commercially available from Toagosei Company. These utilize silsesquioxane skeletal structures composed of random, ladder, cage, and partial cage types, as in Formulas 1-3. In terms of reactive groups, Toagosei offers acryloyl groups (AC) and methacryloyl groups (MAC) for radical polymerization or oxetanyl groups (OX) for cationic polymerization. Oxetanyl denotes a subset of epoxy functional groups that are 4-membered cyclic ethers. Specific UV-curable silsesquioxanes from Toagosei include acrylo functional types (AC-SQ TA-100 and AC-SQ SI-20), methacryl-functional types (MAC-SQ TM-100 and MAC-SQ SI-20), and oxetanyl types (OX-SQ TX-100, OX-SQ SI-20, and OX-SQ ME-20). The SI types introduce a polydimethylsiloxane (silicone) unit into a portion of an SQ skeletal structure.

In formulations that utilize cage-type polysilsesquioxanes (PSQs), the individual POSS components present in the coating composition may have 1 to 12, 2 to 8, 3 to 6 and 4 to 5 reactive functional groups. In one embodiment, one or more, preferably two or more different POSS components each having a different number of reactive functional groups may be present in the coating composition prior to curing. In one embodiment, the POSS components in the coating composition may have an average of 2 to 10 reactive functional groups, or 3 to 6 reactive functional groups. The other functional groups may be selected to perform desired functions or impart certain characteristics to the coatings. The POSS moieties are used in the coating composition in amounts of 1 to 98 wt %, 5 to 50 wt %, or 10 to 35 wt %, based on a total weight of the coating composition.

As noted above, the coating composition may comprise additional non-silsesquioxane monomers and/or oligomers in addition to the UV-curable silsesquioxane causing the composition to have an average combined functionality greater than 1, preferably greater than 2, and preferably greater than 3, which renders it crosslinkable. The monomers and/or oligomers have reactive functional groups that enable UV initiated curing of the coating and are selected from among the following chemical classes: a) free radically curable acrylates, with optional non-acrylate co-reactive components (e.g., thiol, vinyl ether, or methacrylate), b) cationically curable epoxies, with optional non-epoxy co-reactive moieties (e.g., hydroxyl) and/or c) cationically curable vinyl ethers. Exemplary multifunctional acrylate monomers that are used in the coating composition are selected from one or more of propoxylated neopentylglycol diacrylate, tricyclodecane dimethanol diacrylate, hexanediol diacrylate, tetrapropylene glycol diacrylate, trimethylolpropane triacrylate and tripropylene glycol diacrylate. Blends of monofunctional and multifunctional acrylate monomers may be used if desired. It is desirable to avoid using silsesquioxanes, reactive monomers, and reactive oligomers that have aromatic groups since these groups significantly absorb UV light. It is preferable to use aliphatic, cycloaliphatic or fluorinated versions of these components.

In an embodiment, the multifunctional acrylate monomers may be used in amounts of 0.5 to 40 wt %, preferably 5 to 25 wt %, based on the total weight of the coating composition.

In another embodiment, multifunctional non-silsesquioxane acrylate oligomers are used in combination with free radically curable silsesquioxanes. The multifunctional non-silsesquioxane acrylate oligomers include acrylated urethanes that have a functionality of 2 or greater. In an exemplary embodiment, the acrylated urethanes include trifunctional urethane acrylate aliphatic oligomer in addition to a monomer. These are polyurethanes that have been treated so that acrylic or methacrylic functionalities are attached. They may have from 1 to 10, preferably 2 to 5, and more preferably 3 acrylate or methacrylate functionalities per oligomer. Such acrylated urethanes are commercially available from Sartomer, BASF, IGM Resins, Croda, Rahn, UCB Radcure, Allnex, and other suppliers of UV-curable materials. An exemplary oligomer is PHOTOMER 6210 (obtained from IGM Resins). Other multifunctional oligomers such as non-silsesquioxane epoxy oligomers and vinyl ether oligomers may be used if desired, in conjunction with cationically curable silsesquioxanes.

The monomers and oligomers are selected such that they do not significantly absorb UV light except for purposes of undergoing curing and are added in amounts effective to render to the coating composition a viscosity of 10 to 100,000, preferably 2,000 to 5,000 centipoise and a UV light transmittance of the coating composition after curing of 10% or more at a thickness of 25 micrometers and a wavelength of 248 nm (i.e., a UV light absorbance of less than $0.04/\mu m$ at a wavelength of 248 nm). In an embodiment, the multifunctional acrylate oligomers may be used in amounts of 2 to 98 wt %, preferably 60 to 80 wt %, based on the total weight of the coating composition.

Photoinitiators may be used in amounts effective to render UV curing capability, while minimizing UV absorbance. The photoinitiators can be free radical type or cationic type, depending on whether monomers and oligomers are acrylates or methacrylates (for the free radical type) or epoxides or vinyl ethers (for the cationic types). The free radical photoinitiators can be aromatic type or aliphatic type. Aromatic free radical photoinitiators are preferably used at 0.01 to 0.2 wt %, based on the total weight of the coating composition. Exemplary aromatic free radical type photoinitiators are IRGACURE® 819, IRGACURE TPO, IRGACURE 1173, IRGACURE 4265, and IRGACURE TPO-L (commercially available from BASF). Aliphatic free radical photoinitiators are preferably used at 0.5 to 5 wt %. Exemplary aliphatic free radical type photoinitiators include adamantyl methyl ketone and pinacolone. Cationic photoinitiators are preferably alkyl-substituted diaryliodonium or alkyl-substituted triarylsulfonium salts. Aromatic cationic photoinitiators are preferably used at 0.03 to 0.1 wt % for vinyl ethers and 0.1 to 1 wt % for epoxies. Exemplary cationic photoinitiators are Irgacure 250 and Irgacure 270 (commercially available from BASF).

The composition may further comprise an optional silane coupling agent that facilitates bonding of the coating composition to the optical fiber during application and after curing of the composition to form the coating. It is therefore desirable for the silane coupling agent to have at least one alkoxy silane group capable of condensation to form a Si—O—Si bond with the optical fiber. Examples of suitable silanes for free radical curing formulations are γ-methacryloxypropyltrimethoxysilane, γ-acryloxypropyltrimethoxysilane, γ-methacryloxypropyltris(β-methoxyethoxy)silane, γ-acryloyloxypropyltris(β-methoxyethoxy)silane, γ-mercaptopropyltrimethoxysilane, γ-mercaptopropyltriethoxysilane; examples of suitable silanes for cationic epoxy curing formulations are γ-glycidoxypropyltrimethoxysilane, γ-glycidoxypropylmethyldiethoxysilane, β(3,4-epoxycyclohexyl)ethyltrimethoxysilane, or the like, or a combination comprising at least one of the foregoing silane coupling agents. A preferred silane coupling agent for free radical curing systems is γ-acryloyloxypropyltrimethoxysilane. The silanes that have glycidoxy moieties are used in cationic polymerizations that employ silsesquioxane monomers that are epoxy functionalized. Silanes containing vinyl ether reactive groups are likewise suitable for formulations based on cationically curable vinyl ethers.

The silane coupling agent may be used in amounts of 0.5 to 3 weight percent (wt %), based on the total weight of the coating composition. In a preferred embodiment, the silane coupling agent may be used in amounts of 1.0 to 2.0 weight percent (wt %), based on the total weight of the coating composition.

The composition may further comprise one or more of the following additives: an initiator, an antioxidant, thermal stabilizers, UV stabilizers, surface-tension modifying additives, slickness agents, or a combination comprising at least one of the foregoing additives. Preferred additives are photoinitiators and shelf life stabilizers.

The composition may be blended manually or by simple mixing on e.g., magnetic stir plates, or by tumble rolling, or possibly in larger volume with e.g., a propeller blade on a rotating stir shaft. Heat may or may not be needed. Heating is needed in cases where the components are not liquid at room temperature or where viscosities are too high. The composition is typically filtered to remove particulates less than 1 micrometer in size and then disposed onto an optical fiber and subjected to curing or crosslinking. Most of these coatings can be readily applied using pressurized coating applicators as is widely known in the industry for optical fiber coatings. Coatings having lower viscosities (10 to 1000 cP) can be applied using either an open-cup applicator or applicators as described in U.S. Pat. No. 6,958,096 to Lindholm. The compositional ingredients prior to crosslinking also each have relatively low volatility at atmospheric pressure, to allow stable processing while coating optical fibers. Their "flash point" values are generally greater than or equal to 70° C., preferably greater than or equal to 100° C. The coating composition has a viscosity prior to crosslinking of 10 to 100,000 centipoise, preferably 1,000 to 20,000, and more preferably 2,000 to 5,000 centipoise. The coating composition contains very low levels of particulate matter (e.g. gel particles) and may be filterable using sieve sizes of less than 1 micrometer (μm), preferably less than or equal to about 0.8 μm. It is desirable for the coating composition to have a shelf life of greater than or equal to 6 months, preferably greater than or equal to 1 year.

The coating composition has a UV transmission of greater than 10% at a thickness of 25 micrometers and a wavelength of 248 nm, a UV absorbance of less than 1 at a thickness of 25 micrometers and a wavelength of 248 nm, or an optical absorbance less than 0.04/μm. The coating composition has a UV transmission at a wavelength of 248 nm that is greater than 15% at a thickness of 25 micrometers, a UV absorbance that is less than 0.8 at a thickness of 25 micrometers and a wavelength of 248 nm or an optical absorbance that is less than 0.032/μm. In an embodiment, the coating composition has a UV absorbance of less than 0.04/μm, preferably less than 0.024 μm, and more preferably less than 0.01/μm at a wavelength of 248 nm.

Crosslinking is generally conducted using electromagnetic radiation. Electromagnetic radiation includes ultraviolet (UV) radiation, microwave radiation, electron beam radiation, or a combination thereof. A preferred form of radiation for crosslinking the composition is ultraviolet radiation having a wavelength of 100 to 400 nanometers, preferably 200 to 365 nanometers. The ultraviolet radiation may be a combination of ultraviolet A, ultraviolet B, ultraviolet C radiation, or a combination comprising at least one of the foregoing forms of ultraviolet radiation. The crosslinking of the composition may be conducted using a UV radiation dosage having an energy density of 0.1 to 15 joule per square centimeter ($J/cm^2$) after it is disposed onto an optical fiber. In an exemplary embodiment, the coating composition may be cured using a UV radiation dosage having an energy density of less than 10 $J/cm^2$ and preferably less than 1 $J/cm^2$. The curing may be conducted in the presence of an inert gas such as nitrogen, argon, xenon, or a combination comprising at least one of the foregoing inert gases.

The cured coating has a refractive index that can be tailored to be higher or lower than the refractive index of the glass substrate of the optical fiber. Typically, the refractive index of the coating is about 1.48, which is significantly greater than that of silica. This allows the coating to guide away errant light that might leak from the optical fiber core(s) during bending. A cured film of the coating displays an elongation to break that is greater than that of fiber-optic grade silica (greater than 5%, preferably greater than 15%). The elastic modulus at (23° C.) is 1 to 2.5 gigapascals (GPa), preferably 300 to 1200 megapascals (MPa) when measured using a dynamic oscillatory tensile strain at a frequency of 1 radians per second.

When cured the coating has a refractive index of about 1.48 to about 1.50 and displays an elongation to break of greater than 15% and an elastic modulus at 23° C. of 300 to 1200 MPa. In an embodiment, the coating is an acrylate-based formulation having an elastic modulus of 20 to 100 MPa at 100° C. In another embodiment, the coating is an epoxy-based formulation with a modulus of 70 to 1200 MPa at 100° C.

In one embodiment, the fiber has a use temperature that permits it to be used in downhole applications, at temperatures in the range 85 to 250° C. A cured film of the coating, as well as the cured coating on an optical fiber, displays an excellent resistance to moisture, steam and to common solvents (e.g., acetone, isopropanol, hydrocarbons). In exemplary cases, it displays minimal outgassing after cure of less than 3 wt %; preferably less than or equal to 0.5 wt % at temperatures in the range 200 to 350° C. (when heated from room temperature in air at a rate of 10° C./min). It is desirable for the composition to have low alkalinity, such that the pH of an aqueous extract of the composition is less than 7, preferably less than 5 after cure. In certain embodiments, such as for medical applications, the coated fiber is non-toxic and biocompatible, as determined by certification tests, such as those for USP Class VI and ISO 10993 product classifications.

In one embodiment, after the coating composition is disposed on an optical fiber and cured, the fiber is subjected to the formation of gratings without any coating removal. The cured coating has significant optical transparency at 248 nm and FBGs are often written at this wavelength. Writing with lasers at other wavelengths is possible, particularly in the UV range. UV-induced gratings can be side-written into the polymer coated fiber without removing the polymer and without any significant UV absorption by the coating. This is advantageous in that it permits the high speed manufacturing of fiber gratings. A method of manufacturing fiber gratings is disclosed in U.S. Pat. No. 5,620,495 to Aspell et al., the entire contents of which are hereby incorporated by reference. The cured coating displays low optical scattering because it is non-crystalline.

The coating compositions disclosed herein offer increased UV transparency and UV stability, in comparison with current aliphatic hydrocarbon-based urethane acrylate coatings, enabling writing of stronger gratings and superior optical devices. They also offer increased thermal and thermo-oxidative stability, enabling deployment in higher-temperature end-use applications (e.g., down-hole in oil wells). They offer increased modulus versus temperature, for superior thermo-mechanical stability when used in strain sensors. They further offer a lower coefficient of thermal expansion (again, for more stable strain sensors). The coatings can be tailored to display increased coating/glass adhesion, for increased mechanical robustness in harsh or hot/humid environments. The coatings have a relatively low amine content as well as a low hydroxyl content (when compared with other commercial urethane acrylate optical fiber coatings), which permits them to be resistant to moisture and also to display very low corrosivity to silica. The coating composition, the coatings and fibers derived therefrom are exemplified by the following non-limiting examples.

EXAMPLES

Example 1

These examples demonstrate key optical characteristics of selected commercial POSS polyhedral oligomeric silsesquioxanes, with respect to UV transparency and refractive index. Seven POSS materials were obtained, where the pendant groups were aliphatic or cycloaliphatic in nature and the reactive functional groups were selected from among acrylate, methacrylate, and glycidoxy.

Table 1 shows seven different polysilsesquioxanes that were used in this example.

TABLE 1

| Name | Description | Functional Groups | Formula Weight | Approximate Equivalent Weight | Form | Refractive Index at 30° C. and 589 nm |
|---|---|---|---|---|---|---|
| MA0701 | Acrylo Isobutyl POSS | 1 | 930 | 930 | White powder | NA |
| MA0703 | Methacrylate Cyclohexyl POSS | 1 | 1098 | 1098 | White solid | NA |
| MA0718 | Methacrylate Isooctyl POSS | 1 | 1308 | 1308 | Clear, colorless oil | 1.4570 |
| MA0719 | Methacryl Isooctyl POSS | 1 | 1336 | 1336 | Liquid | 1.4582 |
| MA0735 | Methacryl POSS cage mixture | 8, 10, 12 mixture | 1434 | 143 | Clear/hazy, colorless oil | 1.4800 |
| MA0736 | Acrylo POSS cage mixture | 8, 10, 12 mixture | 1322 | 132 | Colorless oil | 1.4803 |
| EP0409 | Glycidyl POSS cage mixture | 8, 10, 12 mixture | 1338 | 134 | Liquid | 1.4778 |

The Table 1 shows polysilsesquioxanes that have a mixture of 8, 10, and 12 functional groups and others that have single functional groups. POSS molecules that have single functional groups may not be used exclusively in the composition without addition of other multifunctional molecules because they do not produce crosslinked coating compositions. It is therefore desirable to blend them with other molecules that contain more than one functional group in order to obtain a crosslinkable mixture. Likewise, exclusive use of POSS molecules with very high functionality has the potential to result in coatings that are excessively brittle or scratch sensitive, e.g., having elongation at break that is lower than that of a high-strength silica fiber substrate.

The absorbance characteristics of some of the uncured POSS samples from Table 1 (those having liquid form at room temperature) were measured and the results are shown in the FIG. 1. A comparative non-silsesquioxane urethane acrylate-based write through coating (WTC), AHF116, was developed by OFS Fitel and was used for comparison. Each sample was tested as a 25 micrometer liquid film placed between two quartz discs using a PTFE spacer prior to measurement. Prior to each measurement, a background spectrum was recorded using a single quartz disk, and this background was automatically subtracted from the sample spectra. In this manner, the measurements were largely compensated for the refraction losses that naturally occur when the sample beam passes from air-to-quartz and quartz-to-air interfaces. From the FIG. 1 it may be seen that some of the POSS moieties (e.g., those that have acrylate or methacrylate reactive functional groups) absorb UV energy at wavelengths around the wavelength absorbed by the comparative write through coating AHF116, while other POSS moieties (e.g., those that have epoxy reactive functional groups) absorb UV energy at lower wavelengths than the wavelength absorbed by comparative write through coating AHF116. The intensity of UV absorption for such aliphatic-based POSS molecules (particularly near 248 nm) is determined largely by the level of acrylate functionality. The monofunctional POSS methacrylates absorb with lower intensity than the AHF116, while the higher-functional POSS acrylate and methacrylate cage mixtures absorb with higher intensity than AHF116. The EP0409 epoxy-functional POSS material displays the lowest UV absorbance, being devoid of the conjugated pi bonds that are present in acrylate groups.

Refractive index values were measured at 30° C. and 589 nm wavelength and are also included in Table 1. In the uncured state, the monofunctional methacrylates had refractive index values lower than or matched to that of silica (lower than 1.458 at 589 nm), while the higher-functional POSS materials all had refractive index greater than that of silica. Except for applications where the coating is designed to function as an optical cladding and to guide light, higher refractive index is preferred during optical fiber manufacturing, in order to enable real-time process monitoring of coating/glass concentricity using well-known light scattering technology. Additionally, in many fiber applications, including shape sensor fiber, it is desirable for the refractive index of a cured optical fiber coating to exceed that of silica, in order to strip away errant transmitted or reflected light that may stray outside of a fiber core during bending. The refractive index of acrylated materials tends to increase upon curing, so that even the mono-functional POSS components can achieve higher refractive index than silica after cure; nevertheless, the POSS molecules having higher refractive index are most often preferred with respect to this particular optical characteristic.

Example 2

Blends of the POSS acrylate and methacrylate components from Table 1 were explored, as one approach to tailoring coating formulation aspects such as UV absorbance intensity, degree of crosslinking, and refractive index. Blends having a molar ratio of acrylate to methacrylate greater than 1 were investigated preferentially, taking into account the common knowledge that methacrylates display relatively slow homopolymerization rates in comparison with acrylates and also taking into account that future WTC formulations may use low levels of photoinitiator in order to minimize UV absorbance, such that even lower polymerization rates may be undesirable. The results are shown in Table 2a and Table 2b. These blends of commercial POSS acrylated and methacrylated components displayed an unexpectedly low level of inter-miscibility with each other.

TABLE 2a

| Material | Description | Form | Functionality | 2A | 2B | 2C | 2D | 2E | 2F | 2G |
|---|---|---|---|---|---|---|---|---|---|---|
| MA0701 | Acrylo Isobutyl POSS | Powder | 1 |  | 85 | 85 | 39 | 35 | 35 |  |
| MA0703 | Methacrylate cyclohexyl POSS | Powder | 1 |  |  |  | 46 |  |  | 47 |
| MA0718 | Methacrylate Isooctyl POSS | Liquid | 1 |  |  |  |  | 50 |  |  |
| MA0719 | Methacryl Isooctyl POSS | Liquid | 1 |  |  |  |  |  | 50 |  |
| MA0735 | Methacryl POSS cage mixture | Liquid | 8, 10, 12 |  | 15 |  |  |  |  |  |
| MA0736 | Acrylo POSS cage mixture | Liquid | 8, 10, 12 | 100 |  | 15 | 15 | 15 | 15 | 53 |
| Observations regarding miscibility, fluidity, and optical clarity of POSS component mixtures |  |  |  | Clear liquid | Mostly dry powder, with minimal apparent dissolution | Not trialed; inferred to be insoluble, based on 2B | Not trialed; inferred to be insoluble, based on 2B and 2G | Very white gel, displaying a yield stress (behaving as a fluid only upon shear) | Not physically trialed; inferred to be a gel, based upon 2E and 2I | White paste |

TABLE 2b

| Material | Description | Form | Functionality | 2H | 2I | 2J | 2K | 2L | 2M | 2N |
|---|---|---|---|---|---|---|---|---|---|---|
| MA0701 | Acrylo Isobutyl POSS | Powder | 1 |  |  |  |  |  | 5 | 5 |
| MA0703 | Methacrylate cyclohexyl POSS | Powder | 1 |  |  |  | 85 |  |  |  |
| MA0718 | Methacrylate Isooctyl POSS | Liquid | 1 | 85 |  |  |  | 60 |  |  |
| MA0719 | Methacryl Isooctyl POSS | Liquid | 1 |  | 85 |  |  |  | 60 | 55 |
| MA0735 | Methacryl POSS cage mixture | Liquid | 8, 10, 12 |  |  |  |  |  |  |  |
| MA0736 | Acrylo POSS cage mixture | Liquid | 8, 10, 12 | 15 | 15 | 15 | 40 | 40 | 95 | 40 |
| Observations regarding miscibility, fluidity, and optical clarity of POSS component mixtures | | | | Hazy; more fluid than 2E; more hazy than 2I | Hazy; more fluid than 2E; less hazy than 2H | Not trialed; inferred to be insoluble, based on 2B and 2G | Hazy after mixing; macro phase separated within 3 days | Hazy after mixing; macro phase separated within 3 days | Macro phase separated within 3 days | Macro phase separated within 3 days |

Example 3

Following the finding of poor inter-miscibility of certain commercial POSS components with each other in Example 2, a series of mixtures was created by blending non-silsesquioxane acrylated monomers with either the MA0736 acrylo POSS cage mixture or either of the two powdered POSS components (MA0707, MA0703). Isobornyl acrylate, IBOA (SR506A, Sartomer), and tricyclodecane dimethanol diacrylate, TCDDMDA (SR833, Sartomer), were selected as diluent monomers for these trials; both contain cycloaliphatic ring structures that were expected to convey low UV absorbance and both are known to impart high glass transition temperature ($T_g$) and high modulus at room temperature. The $T_g$ of isobornyl acrylate homopolymer has been reported to be 94° C. and the $T_g$ of tricyclodecane dimethanol diacrylate homopolymer has been reported to be about 180° C. Additionally, one blend was made using the MA0736 acrylo POSS cage mixture together with a silane adhesion promoter, (3-mercaptopropyl) trimethoxysilane, purchased as B23726 from Alfa Aesar. The compositions and resulting observations are reported in Table 3.

Samples 3A and 3B demonstrated good compatibility of MA0736 acrylo POSS cage mixture with either IBOA or TCDDMDA non-POSS acrylated monomers when mixed in a 50/50 ratio (wt/wt). Further, Sample 3E demonstrated good optical compatibility of MA0736 when blended with 2 wt % of the mercaptosilane adhesion promoter.

Sample 3C demonstrated that the MA0701 acrylo isobutyl POSS powder was soluble when blended at a 10/90 ratio (wt/wt) with IBOA. The mixture initially appeared hazy upon first mixing, but exhibited good compatibility by becoming optically clear within 3 days and by retaining good optical clarity 6 months later.

In Sample 3D, the MA0703 methacrylate cyclohexyl POSS powder was blended with IBOA in a 28/72 ratio (wt/wt). It did not dissolve readily and the mixture was found to be macro phase separated within 3 days at room temperature.

non-PSQ acrylate monomers, a series of mixtures was created by blending either MA0735 or MA0736 (meth) acrylo POSS cage mixtures with either of two non-PSQ UV-curable acrylate compositions that are commercially used as optical fiber coatings. In this case, an objective was to attain higher viscosity. One of the optical fiber coatings was AHF116, an OFS custom write-through coating based upon aliphatic urethane acrylate and having an appropriately low concentration of photoinitiator. The other optical fiber coating was OF-211, a commercial silicone acrylate composition manufactured by Shin-Etsu MicroSi. This coating was presumed to have a much higher level of photoinitiator, since it is formulated to convey relatively high cure speed and not necessarily high UV transparency. The compositions of the blends are disclosed in Table 4.

Sample 4A demonstrated that a 5/95 (wt/wt) liquid blend of MA0735 methacryl POSS cage mixture with AHF116 was compatible (optically clear), while Sample 4B demonstrated that a 95/5 blend of the same two components was also miscible, but slightly hazy. Sample 4C demonstrated that a 36/64 (wt/wt) blend of MA0736 acrylo POSS cage mixture with AHF116 was optically clear and miscible. Sample 4D was a 5/95 blend of MA0736 with OF-211 and displayed intermediate compatibility; the blend did not macro phase separate but displayed some pearlescence, which is interpreted to represent micro phase separation on a size scale commensurate with those of visible wavelengths (400-770 nm) or larger. Sample 4E was a 32/68 blend of MA0736 with OF-211 that also did not appear to be fully miscible. Sample 4H was a 95/5 blend of MA0736 with OF-211 that initially appeared somewhat immiscible (pearlescent) but that developed greater clarity with time; this sample appeared optically clear when observed 6 months after mixing. The viscosity of Sample 4H was higher than that of OF-211, hampering their initial mixing.

TABLE 3

| Material | Description | Form | Functionality | Viscosity @ 25° C. (centipoise) | 3A | 3B | 3C | 3D | 3E |
|---|---|---|---|---|---|---|---|---|---|
| MA0701 | Acrylo isobutyl POSS | Powder | 1 | NA | | | 10 | | |
| MA0703 | Methacrylate cyclohexyl POSS | Powder | 1 | NA | | | | 28 | |
| MA0736 | Acrylo POSS cage mixture | Liquid | 8, 10, 12 | 2200 | 50 | 50 | | | 98 |
| SR506A (Sartomer) | Isobornyl acrylate | Liquid | 1 | 8 | 50 | | 90 | 72 | |
| SR833 (Sartomer) | Tricyclodecane dimethanol diacrylate | Liquid | 2 | 130 | | 50 | | | |
| B23726 (Alfa Aesar) | (3-mercaptoproypl)trimethoxysilane, 95% | Liquid | NA | 2 | | | | | 2 |
| | Observations regarding miscibility, fluidity, and optical clarity of POSS component mixtures with non-PSQ components | | | | Optically clear on Day 1 and remained clear 6 months later. Low viscosity. | Optically clear on Day 1 and remained clear 6 months later; slightly more viscous than 3A. | Hazy upon first mixing, but optically clear 3 days later and remained clear 6 months later. | Did not instantly dissolve, and became partially macro phase separated within 3 days. | Optically clear on Day 1 and remained clear 6 months later. |

Example 4

Following the partial success in Example 3 in blending of certain POSS acrylate or methacrylate components with Cursory investigations were made regarding the feasibility of UV curing films of the formulations in Table 4. Liquids were spread onto glass plates using Bird film applicators to achieve controlled, uniform film thicknesses in the range 150-300 micrometers. Individually, each liquid film was placed into an enclosure fitted with a quartz lid where each was subjected to a gentle nitrogen purge for about 3 minutes; then each film was irradiated within the enclosure using a selected UV dose in the range 1-14 J/cm$^2$ that was imposed using a UVPS bench top UV curing system fitted with a mercury lamp. The UV dose was monitored using a UV Power Puck™ radiometer (EIT). Samples 4A and 4B did not cure successfully, and their slow cure was attributed to the combined effects of the relatively low level of photoinitiator in AHF116 and the generically slow cure speed of the methacrylate groups that were contributed by the MA0735 component. Sample 4C (36/64 blend of MA0736 with AHF116) cured well to form a non-tacky film; the 4C film was relatively hard and brittle and it broke more easily than a film of AHF116 upon flexing. Sample 4D (a 5/95 blend of MA0736 with OF-211) cured well to form a relatively soft film, similar in feel to a primary optical fiber coating, deemed not to be sufficiently hard for use as a robust outer coating or single-layer coating for FBG manufacturing. Sample 4E (a 32/68 blend of MA0736 with OF-211) appeared "cheesy" upon cure, crumbling easily and evincing low elongation. Sample 4F (a 40/60 blend of MA0736 with OF-211) was not subjected to UV curing, due to its poor internal compatibility. UV cured films of Sample 4G (90/10 blend of MA0736 with OF-211) and Sample 4H (95/5 blend of MA0736 with OF-211) were both relatively hard and brittle. The film of Sample 4G displayed significant haze, while the film of Sample 4H had good optical clarity.

ponents. Example 2 taught that commercially available grades of aliphatic and cycloaliphatic POSS acrylated and methacrylated components are not all universally compatible with each other in forming optically clear, miscible blends. Such POSS grades have until now been commercially available predominantly in methacrylate-functional rather than acrylate-functional versions, where acrylates are more preferred for write-through coatings, due to the necessity of achieving satisfactory cure speed with low levels of photoinitiator. Available POSS grades until now have also been predominantly mono-functional and thus could not be used exclusively to satisfy the criterion of formulating a crosslinkable composition. Based on initial screening tests, the MA0736 acrylo POSS cage mixture (n=8, 10, 12) was expected to produce highly crosslinked coatings having too-low elongation or too-high UV absorbance if used exclusively. Upon request, two custom liquid, aliphatic-based POSS acrylated materials were created and supplied to OFS by Hybrid Plastics, wherein the custom materials were synthesized to incorporate intermediate functionality (di-functionality). One custom POSS material was named IBA-2D, isobutyl acrylate, difunctional heterocage. The other was named IOA-2D, isooctyl acrylate, difunctional heterocage. Each was designed to have an average functionality of about 2 acrylate groups per POSS cage. The non-reactive pendant groups at the remaining corners of the

TABLE 4

| Material | Description | Refractive index, liquid, at 589 nm and 25-30° C. | 4A | 4B | 4C | 4D | 4E | 4F | 4G | 4H |
| --- | --- | --- | --- | --- | --- | --- | --- | --- | --- | --- |
| MA0735 | Methacryl POSS cage mixture | 1.48 | 5 | 95 | | | | | | |
| MA0736 | Acrylo POSS cage mixture | 1.48 | | | 36 | 5 | 32 | 40 | 90 | 95 |
| AHF116 | Custom write-through non-PSQ urethane acrylate optical fiber coating (OFS) | 1.49 | 95 | 5 | 64 | | | | | |
| OF-211 | UV-curable silicone acrylate optical fiber coating (Shin-Etsu MicroSi) | 1.49 | | | | 95 | 68 | 60 | 10 | 5 |
| Observations regarding miscibility, fluidity, and optical clarity of POSS components blended with selected non-PSQ optical fiber coatings | | | Optically clear mixture, prone to bubble entrainment; viscosity is higher than AHF116. | Miscible, but a little hazy | Miscible | Has fair optical clarity; pearlescent but not macro phase separated. Viscosity is higher than that of OF-211. Prone to bubble entrainment and readily foams upon mixing. | Not fully miscible. | Macro phase separated within 5 days | Pearlescent fluid | Initially somewhat pearlescent, but developed clarity with time. Optically clear 6 months after mixing. Viscosity was higher than OF-211, hampering mixing. |

Example 5

This example describes the concept and initial feasibility tests of formulations using difunctional POSS acrylate components. POSS cages were either isobutyl or isooctyl, as indicated by the product names. Of the two materials, the initial sample of the IOA-2D was optically clear, while the initial sample of IBA-2D was relatively hazier.

A series of compositions was made using either of the IOA-2D and IBA-2D difunctional POSS acrylate heterocage materials, as detailed in Table 5. Similar comparative compositions were made using the MA0736 acrylo POSS cage mixture. A primary goal was to screen key properties of each POSS component when UV cured as a homopolymer in the presence of specific types and levels of photoinitiators. One photoinitiator was Irgacure 819, phenylbis(2,4,6-trimethylbenzoyl)-phosphine oxide, also known as BAPO. The BAPO photoinitiator is known to be highly reactive at low concentrations and the UV absorbance of its compositions is generally known to decrease (photo-bleach) upon UV exposure, making it an attractive photoinitiator for use in WTCs. BAPO is a crystalline solid at room temperature, so it was first dissolved at a level of 3 wt % in IBOA prior to incorporating it into Samples 5A, 5D, and 5G. A second photoinitiator used was Irgacure 1173, 2-hydroxy-2-methyl-1-phenyl-1-propanone. Irgacure 1173 is a liquid, providing the benefit that it does not require dissolution when incorporating into a composition. Of additional benefit, Irgacure 1173 is an alpha-hydroxy type ketone, known for conveying good surface cure. A third photoinitiator used was Irgacure 4265, which is a liquid blend of Irgacure 1173 with diphenyl (2,4,6,-trimethylbenzoyl)phosphine oxide, also known as TPO. The Irgacure 4265 offers the benefits of Irgacure 1173 with respect to liquid form and its assistance with surface cure, while also providing the high reactivity and photo-bleaching character of TPO, an acylphosphine oxide.

MA0736 and displayed a hazy appearance. Portions of the samples were retained as liquids for 4 months and were again examined for visual appearance. Samples 5A and 5G containing Irgacure 819 developed noticeable yellowness upon standing. Samples 5C and 5I were noteworthy in displaying the best long-term optical clarity and the lowest visible yellowing among compositions in Table 5, owing to the use of Irgacure 4265, together with either MA0736 or IOA-2D POSS acrylates.

Some of the compositions in Table 5 were used to cure films, using the methods described in Example 4. Samples 5A, 5D, and 5G with 0.06 weight percent Irgacure 819 became relatively hard and brittle after UV cure and were somewhat difficult to remove from the glass plate. These each displayed a slightly tacky top surface, attributed to low photoinitiator level and some oxygen inhibition associated with insufficient nitrogen purging. Sample 5D using IBA-2D difunctional POSS acrylate was noticeably less brittle and more flexible than Sample 5A, which used the MA0736 acrylo POSS cage mixture having higher acrylate functionality. Samples 5F and 5I using 1 weight percent Irgacure 4265 also appeared relatively brittle after cure, but they did not display surface tackiness; these samples were formulated using the IBA-2D and IOA-2D difunctional heterocage POSS components, respectively. The improvement in surface cure of these films in comparison with Samples 5D and 5G was attributed to the difference in the type and amount of photoinitiator, helping to overcome oxygen inhibition.

TABLE 5

| Material | Description | Form | 5A | 5B | 5C | 5D | 5E | 5F | 5G | 5H | 5I | 5J |
|---|---|---|---|---|---|---|---|---|---|---|---|---|
| MA0736 | Acrylo POSS cage mixture (n = 8, 10, 12) | Liquid | 98 | 98 | 99 | | | | | | | 50 |
| IBA-2D | Isobutyl acrylate, difunctional heterocage | Liquid | | | | 98 | 98 | 99 | | | | |
| IOA-2D | Isooctyl acrylate, difunctional heterocage | Liquid | | | | | | | 98 | 98 | 99 | 50 |
| SR506 | Isobornyl acrylate | Liquid | 1.94 | | | 1.94 | | | 1.94 | | | |
| Irgacure 819 | Photoinitiator, BAPO | Solid | 0.06 | | | 0.06 | | | 0.06 | | | |
| Irgacure 1173 | Photoinitiator, alpha-hydroxy type | Liquid | | 2 | | | 2 | | | 2 | | |
| Irgacure 4265 | Photoinitiator, 50/50 TPO + 1173 | Liquid | | | 1 | | | 1 | | | 1 | |
| Visual appearance of liquid compositions 4 months after mixing | | | Yellowish liquid | Mostly colorless liquid | | Cloudy | Cloudy | Yellowish liquid | Colorless liquid | Clear, colorless liquid | Hazy, as from the beginning. |
| Results upon UV curing of films, 6-mil thickness and UV dose of 1 joule per square centimeter | | | Brittle; cracked during cure and upon removal from glass plate. Yellowish after cure. A little tacky on top. | | | Brittle, but not as brittle as 5A. A little tacky on top. Some "orange peel" on the surface. | Hard and brittle. | Somewhat brittle; somewhat difficult to remove from glass. Surface a little tacky on top. | | Hard and brittle; difficult to peel from glass. Top not tacky. | |

Samples 5G, 5H, and 5I based on IOA-2D di-functional POSS heterocage displayed good optical clarity immediately after mixing. Similarly, Samples 5A, 5B, and 5C using the higher-functional MA0736 acrylo POSS cage mixture displayed good optical clarity. Samples 5D, 5E, and 5F based on IBA-2D appeared to be miscible but slightly hazy. Sample 5J comprised a 50/50 blend of IOA-2D with Example 6

In this example, MA0736 acrylo POSS cage mixture was blended with a commercial aliphatic urethane triacrylate oligomer, designated here as UrAcr Oligomer, and different (mostly low, less than 0.2 wt %) levels of photoinitiator. One photoinitiator, Irgacure 819 (BASF), was first dissolved in a diluent monomer, SR506 Isobornyl acrylate (Sartomer) before blending. Another photoinitiator, Irgacure 4265, was used in its original liquid form. Samples (6A, 6B, 6C, 6D, 6E, 6F) were prepared as listed in Table 6. All samples displayed good compatibility among their components in the liquid state, as evidenced by good optical clarity. The first 4 samples utilized Irgacure 819 and displayed some yellowness of the liquids after mixing, while Samples 6E and 6F utilized Irgacure 4265 and their liquids remained relatively colorless.

Sample 6A (using an 18/82 wt/wt blend of MA0736 and UrAcr Oligomer) and Sample 6B (using a 30/70 wt/wt blend of MA0736 and UrAcr Oligomer) were used to prepare UV-cured films as described in Example 4, resulting in 6-mil thick films that had been irradiated using a UV dose of 1 joule per square centimeter. Both 6A and 6B produced films having good optical clarity and greater stiffness than a similar film of the AHF116 comparative write-through coating. Films from both Sample 6A and 6B retained good flexibility, not appearing overly brittle and not displaying surface tack.

Samples 6C, 6D, 6E, and 6F were assembled as 25 micrometer thick films between quartz disks, as described in Example 1. Optical absorbance values were recorded for the uncured liquids over the wavelength range 190 to 1100 nm. Then the film assemblies were exposed to a UV dose of 1 joule per square centimeter using the UVPS conveyorized UV curing system, and again the absorbance spectra were recorded. Subsequently, a subset of the samples was exposed to additional passes in the UVPS system to reach a total exposure of 7 joules per square centimeter, and the absorbance spectra were again recorded. The values for optical absorbance of the various samples at a UV wavelength of 248 nm are summarized in Table 6, including data for a film of the comparative reference write-through coating AHF116. The data demonstrate that UV absorbance of the acrylate-based formulations is strongly affected by the UV exposure dose, decreasing from the liquid to the cured state. The UV absorbance is further influenced by the type and amount of photoinitiator.

Figure 2:
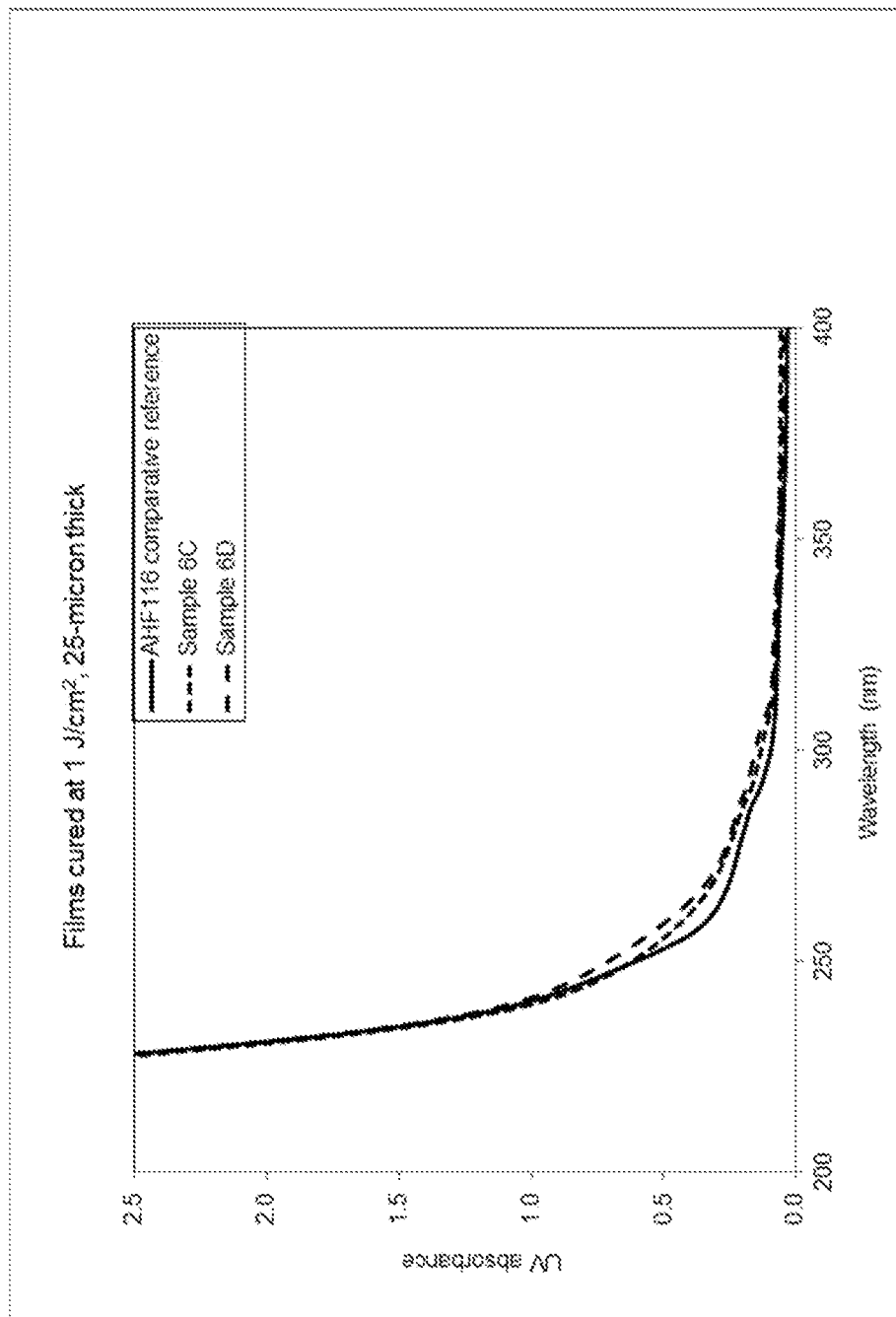
FIG. 2 shows UV spectra of Samples 6C and 6D, which are blends of 30 to 40 wt % MA0736 acrylo POSS cage mixture with a commercial aliphatic urethane acrylate resin and compares these with the spectrum of AHF116 comparative non-silsesquioxane write through coating, illustrating comparable UV transparency at 248 nm, utilizing similar photoinitiator loadings and the same UV dose.

The absorption spectra of some of the cured coating compositions are shown in the FIG. 2. The FIG. 2 contains data for the comparative composition AHF116 as well as for Samples 6C and 6D (shown in the Table 6) and shows comparable UV transparency at 248 nm. The variations include mixtures that contain 30 wt % and 40 wt % of POSS molecule MA0736 with the bulk of the remainder of the composition being the UrAcr Oligomer, which is an aliphatic non-silsesquioxane urethane acrylate that has a functionality of 3 and is itself a blend of monomers and oligomers. From the FIG. 2 it may be seen that the absorption characteristics of the comparative sample AHF116 and those of the inventive samples that contain the POSS molecule MA0736 are quite similar at low photoinitiator levels, indicating that the POSS molecules may be used to coat optical fibers that can eventually be used in a write through mode.

Example 7

This example was conducted primarily with epoxy functionalized POSS molecules. The epoxy functionalized molecule is EP0409 glycidyl functionalized POSS cage mixture (n=8, 10, 12). EP0409 glycidyl POSS cage mixture was mixed with a cationic photoinitiator, Irgacure 250 (BASF). Irgacure 250 is a liquid comprising a 75 weight percent solution of (4-methylphenyl)[4-(2-methylpropyl) phenyl]-iodonium hexafluorophosphate dissolved in propylene carbonate.

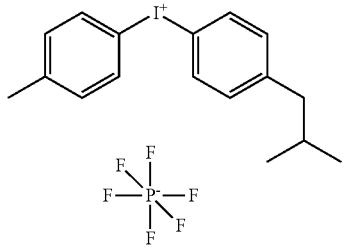 [SMILES: Cc1ccc([I+]c2ccc(CC(C)C)cc2)cc1 ; F[P-](F)(F)(F)(F)F]

Two different photoinitiator levels (0.25 parts per hundred and 1 part per hundred respectively based on the weight of the coating composition) were used. The compositions are described in Table 7. Sample 7A (0.25 phr Irgacure 250) and Sample 7B (1 phr Irgacure 250) were examined 1 day following mixing, and their liquids were observed to be optically clear.

Attempts were made to prepare 6-mil thick films as in Example 4 by curing the resins on glass plates. However, the cured coating could not easily be removed by hand. Subsequently, 6-mil thickness films were UV-cured atop sheets of silicone-coated release paper that were affixed to glass plates. Unlike Example 4, the films were not subjected to a nitrogen purge before curing; rather they were cured in ambient air. Epoxies are known not to suffer oxygen inhibition in the same manner as acrylates; however, the cationic curing mechanism can be affected by ambient humidity. A film of Sample 7A was exposed to a UV dose of about 1 joule per centimeter squared and could be removed from the release paper; it was soft, displayed relatively low elongation, and the surface was tacky. Another film of Sample 7A was cured with three UV exposure passes, totaling about 3 joules per square centimeter; at the higher UV dose, Sample 7A also displayed relatively low elongation, but its surface was tack free. Films of Sample 7B were cured in a similar manner. The resulting film of Sample 7B that was cured at 1 joule per centimeter squared had a tack-free surface, demonstrating a benefit of higher photoinitiator level. A film of 7B cured at 3 joules per square centimeter appeared stiffer and relatively brittle when bent, but it could withstand being scratched with a fingernail without breaking.

Samples 7A and 7B were then examined as 25 micrometer thick films between quartz disks, using the method described in Example 6. The values for optical absorbance of the Samples 7A and 7B at a UV wavelength of 248 nm are summarized in Table 7, in comparison with data for a film of the comparative reference write-through coating AHF116. The data demonstrate that UV absorbance of the epoxy-based POSS formulations is influenced by the amount of photoinitiator, with absorbance increasing at higher levels. The UV absorbance is also affected by the UV exposure dose, decreasing in magnitude from the liquid to the cured state. However, this effect is less pronounced than with the acrylate formulations, owing to the absence of C=C and C=O bonds in the acrylate coatings. Table 7 also demonstrates that UV absorbance can reach a minimum or optimum value, as a function of the amount of UV dose, such that at even higher UV doses the absorbance will increase. This is attributed to yellowing associated with either photo-oxidation of the coating or to some type of highly absorbing photoinitiator by-products.

Figure 3:
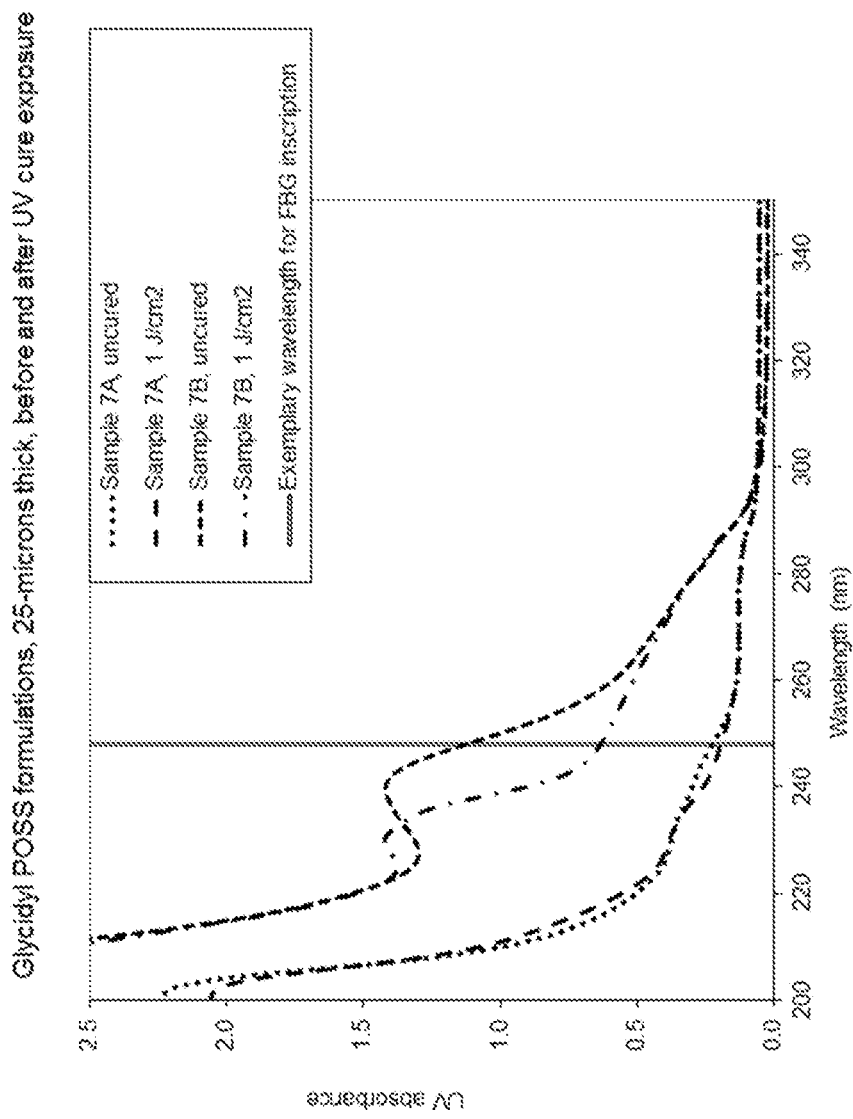
FIG. 3 shows UV spectra of both liquid and cured EP0409 glycidyl POSS silsesquioxane formulations at two different photoinitiator levels.

The absorbance spectra for both uncured and cured samples are shown in the FIG. 3. The absorbance spectra were measured prior to and after curing. The comparative coating AHF116 was also measured as a reference and its spectra are shown in the FIGS. 1 and 2. The curing was conducted at a UV dose of 1 J/cm². From the FIG. 3 it may be seen that the coating compositions that contain the epoxy functionalized POSS molecules generally absorb at lower wavelengths than the comparative sample. At the wavelength of 248 nm, the absorbance depends strongly on the amount of photoinitiator, so that the epoxy POSS compositions have the potential to provide superior, lower optical absorbance.

Figure 5:
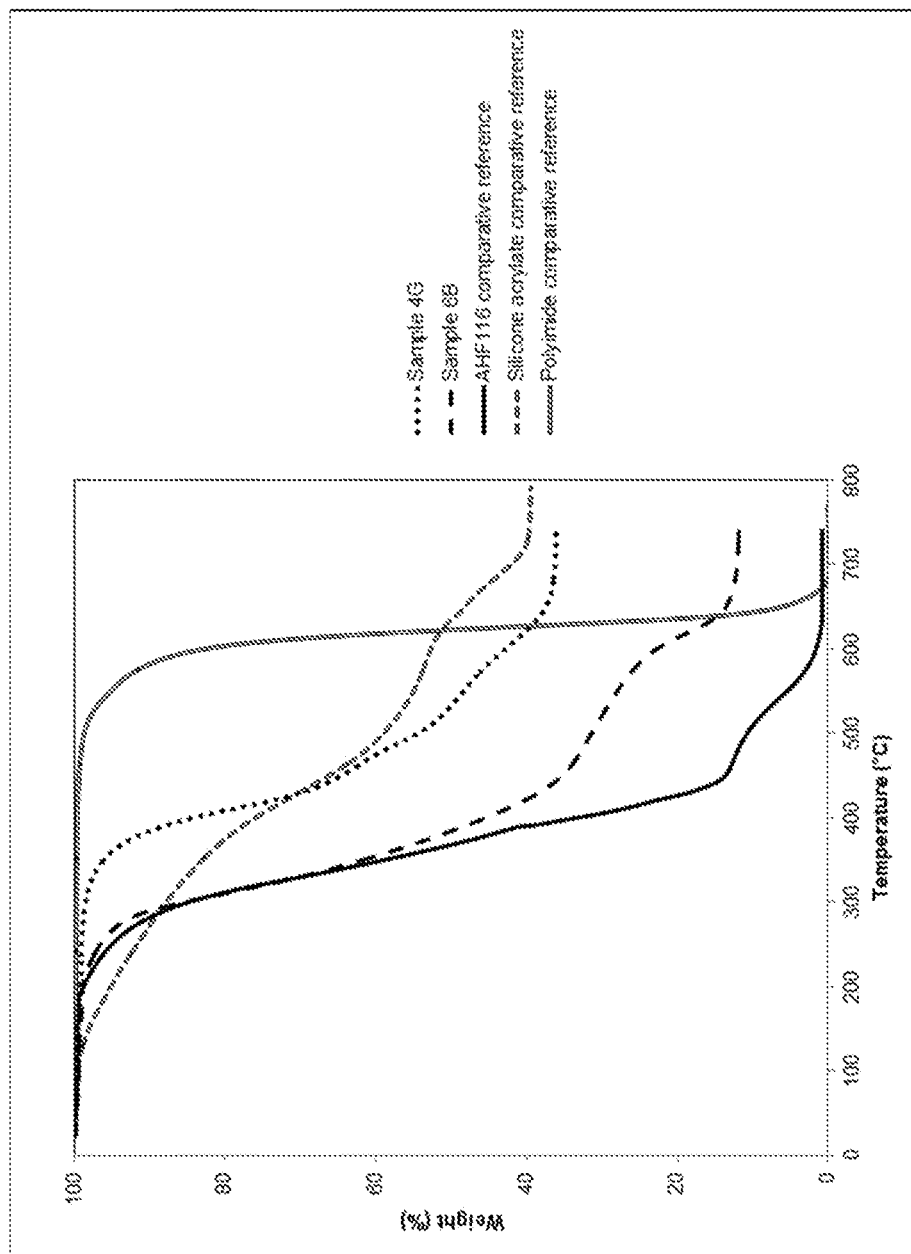
FIG. 5 is another graph that shows weight loss versus temperature for some POSS silsesquioxane based cured coatings (Samples 4G and 6B) as well as for three cured comparative non-silsesquioxane optical fiber coatings: AHF116 urethane acrylate, OF-211 silicone acrylate (Shin-Etsu MicroSi), and a thermally cured polyimide.

AHF116 non-PSQ urethane acrylate comparative reference write through coating Samples in FIG. 5 include:
Sample 4G
Sample 6B
AHF116
OF-211 silicone acrylate optical fiber coating
PyroCoat™ polyimide optical fiber coating (present as part of a commercial-grade polyimide-coated optical fiber produced by OFS, not a film)

Figure 4:
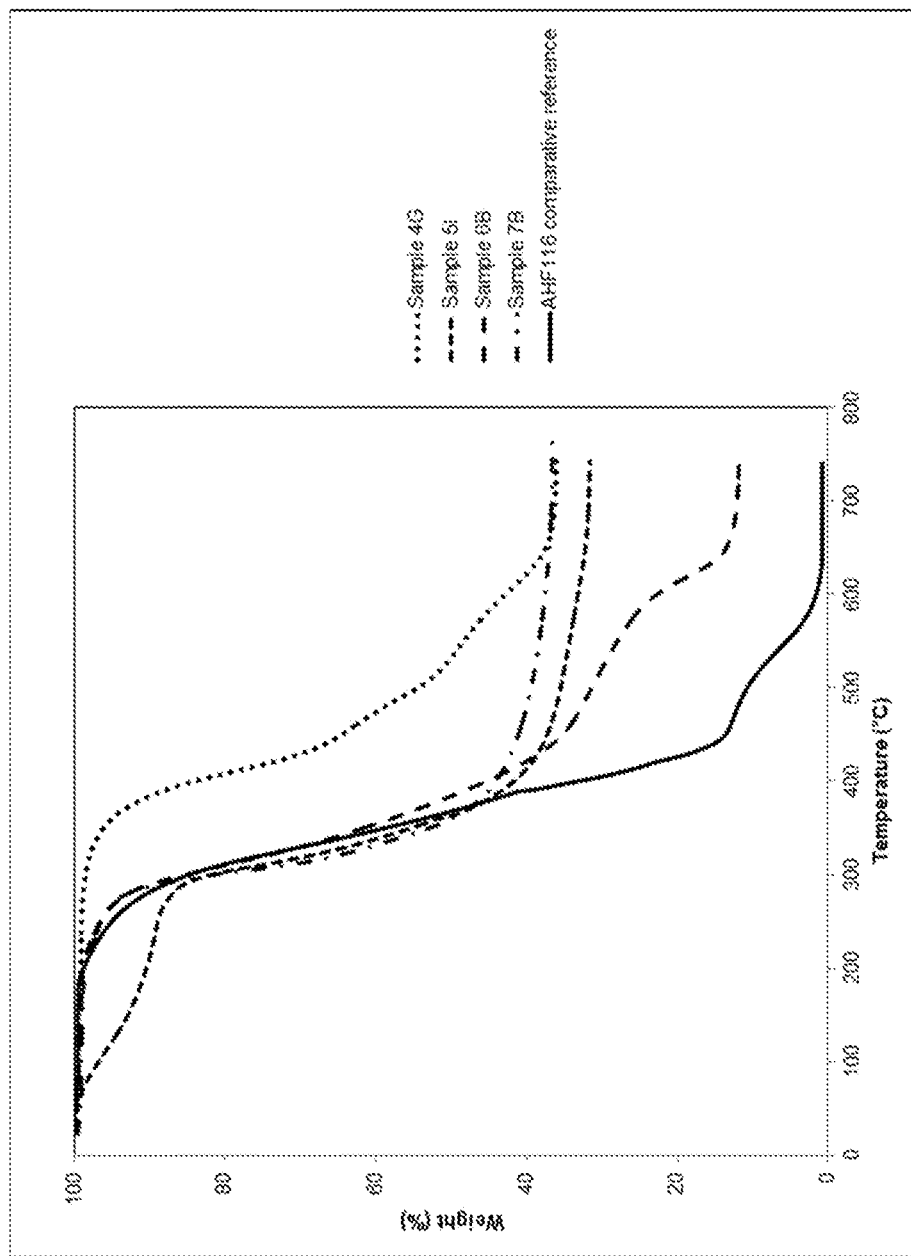
FIG. 4 is a graph that shows weight loss versus temperature for some POSS silsesquioxane based cured coatings (Samples 4G, 5I, 6B and 7B) as well as for the cured comparative non-silsesquioxane coating AHF116.

The films in FIGS. 4 and 5 were nominally 6-mil in thickness and were cured using a UV dose of 1 joule per square centimeter, with the exception of Sample 7B, which was cured using 7 joules per square centimeter.

TABLE 6

| Material | Description | Form | Functionality | 6A | 6B | 6C | 6D | 6E | 6F | |
|---|---|---|---|---|---|---|---|---|---|---|
| MA0736 | Acrylo POSS cage mixture | Liquid | 8, 10, 12 | 18 | 30 | 30 | 40 | 30 | 40 | AHF116 |
| UrAcr Oligomer | Aliphatic urethane acrylate oligomer | Liquid | 3 | 82 | 70 | 70 | 60 | 70 | 60 | non-PSQ comparative |
| SR506 | Isobornyl acrylate | Liquid | 1 | 1.94 | 1.94 | 1.94 | 1.94 | | | reference |
| Irgacure 819 | Photoinitiator, BAPO | Solid | | 0.06 | 0.06 | 0.06 | 0.06 | | | write through |
| Irgacure 4265 | Photoinitiator blend | Liquid | | | | | | 1.0 | 0.1 | coating |
| UV absorbance at 248 nm | Liquid | | | | | 1.806 | 1.666 | 2.426 | 1.454 | 1.845 |
| wavelength of 25 micrometer films | After UV irradiation with 1 joule per square centimeter | | | | | 0.668 | 0.762 | 1.448 | 0.740 | 0.677 |
| between quartz disks | After UV irradiation with 7 joules per square centimeter | | | | | 0.588 | 0.662 | | | |

TABLE 7

| Material | Description | Form | 7A | 7B | |
|---|---|---|---|---|---|
| EP0409 | Glycidyl POSS cage mixture | Liquid | 100.00 | 100.00 | AHF116 |
| Irgacure 250 | Cationic photoinitiator, iodonium type | Liquid | 0.25 | 1.00 | non-PSQ comparative reference write through coating |
| Appearance of 6-mil film cured on release paper | After UV irradiation with 1 joule per square centimeter | | Partially cured; tacky surface | Low elongation; surface is not tacky | |
| | After UV irradiation with 3 joules per square centimeter | | Soft film, not tacky; low elongation | Stiff, brittle; can be scratched with a fingernail without breaking | |
| UV absorbance at 248 nm | Liquid | | 0.226 | 1.121 | 1.845 |
| wavelength of 25 micrometer | After UV irradiation with 1 joule per square centimeter | | 0.195 | 0.634 | 0.677 |
| films between quartz disks | After UV irradiation with 7 joules per square centimeter | | | 0.705 | |

Example 8

This example was conducted to demonstrate the thermal properties of the coating compositions that include the POSS molecules. The data are shown in the FIGS. 4 and 5. FIGS. 4 and 5 are graphs that show the thermogravimetric analysis of cured films (e.g., weight loss vs. temperature). All samples were heated at a rate of 10° C./min in air during the thermogravimetric analysis. For this test, UV cured films from the prior examples were used. Samples in FIG. 4 include:
Sample 4G (a 90/10 wt/wt blend of MA0736 acrylo POSS cage mixture with OF-211 silicone acrylate coating)
Sample 5I (IOA-2D difunctional POSS heterocage with 1 wt % Irgacure 4265)
Sample 6B (a 30/70 wt/wt blend of MA0736 with UrAcr Oligomer, including 0.06 phr Irgacure 819 dissolved in 1.94 phr Isobornyl acrylate)
Sample 7B (EP0409 glycidyl POSS cage mixture with 1 phr Irgacure 250)

In comparison with the AHF116 comparative sample, the 30/70 blend of MA0736 acrylo POSS cage mixture with UrAcr Oligomer (Sample 6B) and the EP0409 glycidyl POSS cage mixture (Sample 7B) show superior thermal stability at the higher temperatures. The IOA-2D (isooctyl diacrylate) material (Sample 5I) also shows superior thermal stability at higher temperatures, although it displayed greater loss at the lower temperatures. The blend of MA0736 with OF-211 silicone acrylate (Sample 4G) showed the highest stability among the coatings in FIG. 4.

FIG. 5 is a graph showing thermal degradation behavior (e.g., weight loss vs. temperature) behavior that includes OF-211 silicone acrylate and PyroCoat polyimide. In the case of the polyimide coating, the data were obtained using a coated optical fiber, and the coating weight was normalized to eliminate the glass weight. The data illustrate the enhancing effect of MA0736 on the OF-211 thermal stability.

Figure 6:
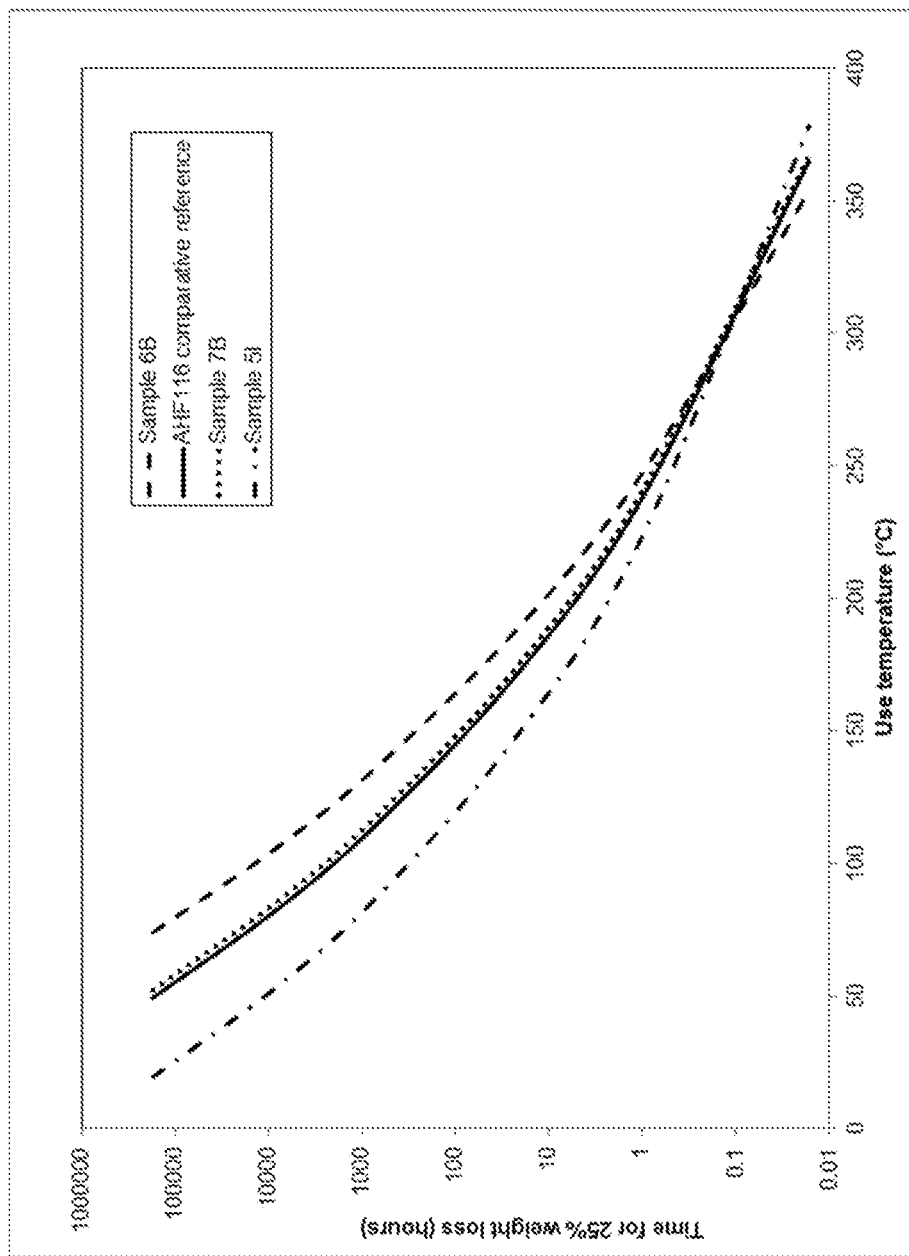
FIG. 6 is a graph showing life cycle behavior that illustrates that the use temperatures and/or lifetimes of certain POSS-based coatings (Samples 6B and 7B) are equivalent or superior to those of the non-silsesquioxane coating AHF116.

Thermogravimetric analysis was used to estimate the "lifetime" of coating films, per the method published by OFS in J. Lightwave Technology (Stolov, Simoff). Details are shown in the FIG. 6. In the FIG. 6, the lifetime has been estimated using the somewhat arbitrary criterion of 25% weight loss. In comparison with comparative coating composition AHF116, the Sample 6B formulation with 30 wt % MA0736 POSS acrylate shows enhanced stability, while the Sample 7B epoxy POSS formulation shows performance comparable to AHF116, and the Sample 5I (IOA-2D) diacrylate POSS heterocage formulation showed the lowest stability. From the FIG. 6, it may be seen that some of the exemplary POSS coatings that contain epoxy and acrylate functionalized POSS are thermally stable at temperatures of greater than 100° C., even at temperatures of greater than or equal to about 150° C. and even at temperatures of greater than or equal to about 200° C. when heated in air at the rate of 10° C./min.

Example 9

Figure 7:
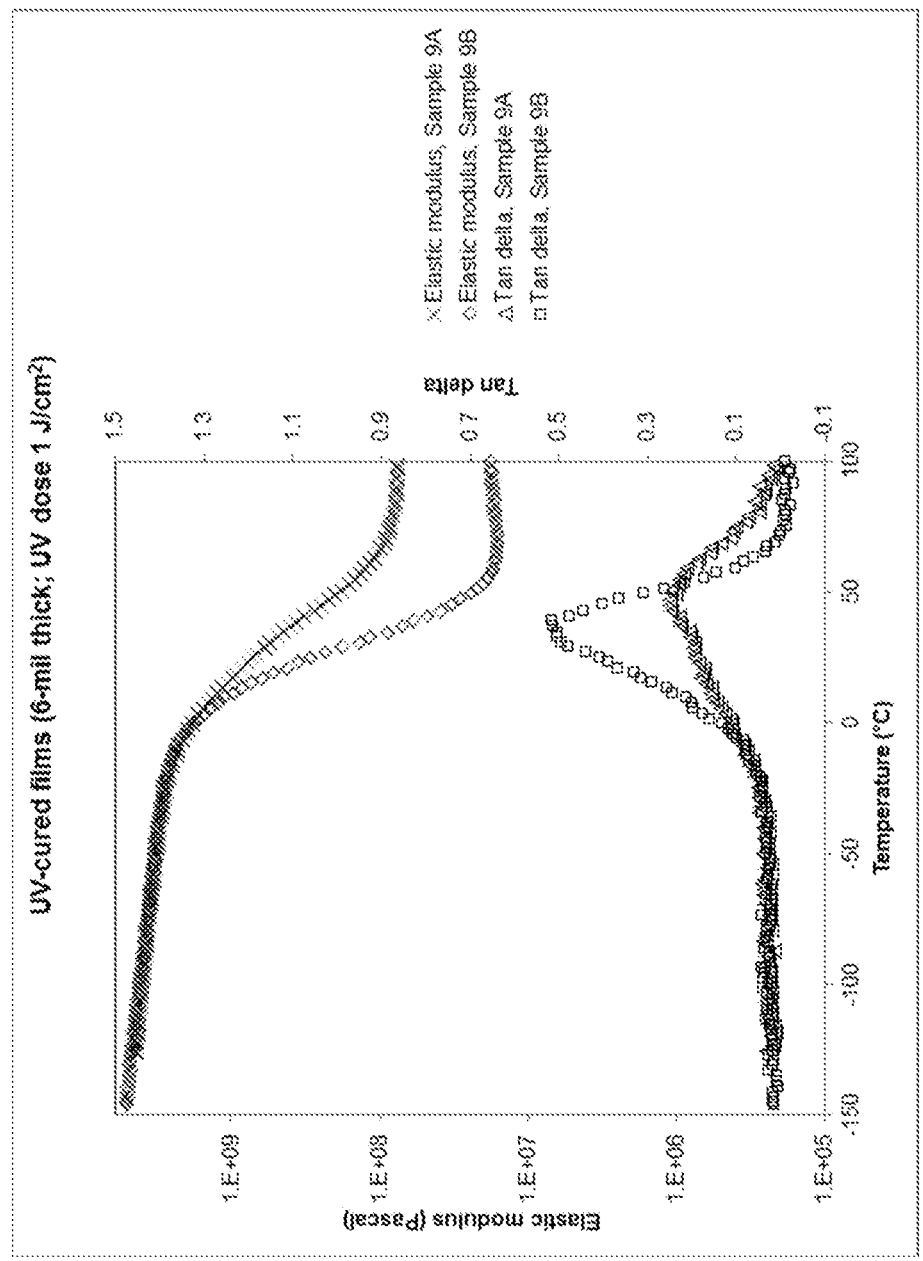
FIG. 7 shows the dynamic mechanical storage modulus and tan delta damping behavior for a) an inventive composition Sample 9A that contains a cured blend of a POSS silsesquioxane acrylate (MA0736) (30 wt %) together with a urethane acrylate oligomer and b) a similar comparative composition Sample 9B based on the same urethane acrylate oligomer without the POSS component.

This example was conducted to determine the dynamic elastic modulus (the storage modulus) of cured films that contain certain POSS molecules. Table 8 describes the compositions of three inventive materials that were tested (Samples 9A, 9C, and 9D) and the composition of one comparison material (Sample 9B). FIG. 7 shows the dynamic elastic modulus and the tan delta loss spectrum of cured films of Samples 9A and 9B. The POSS-containing formulation (Sample 9A) shows a greater than 3× increase in equilibrium modulus over Sample 9B, with only a minor penalty in UV transmission. Films were cured at 1 J/cm² and the data were collected at an oscillatory frequency of 1 rad/sec.

TABLE 8

| Material | Description | 9A | 9B | 9C | 9D | 9E |
|---|---|---|---|---|---|---|
| EP0409 (Hybrid Plastics) | Glycidyl POSS cage mixture | | | 99.25 | 99.00 | 99.50 |
| MA0736 (Hybrid Plastics) | Acrylo POSS cage mixture | 30.00 | | | | |
| UrAcr Oligomer | Aliphatic urethane acrylate oligomer | 67.20 | 98.00 | | | |
| TPGDA (Allnex) | Tripropylene glycol diacrylate | 2.72 | 1.94 | | | |
| Irgacure 819 (BASF) | Photoinitiator, BAPO, free radical type | 0.08 | 0.06 | | | |
| Irgacure 250 | Photoinitiator, iodonium salt, cationic type | | | 0.75 | 1.00 | 0.50 |
| Glass transition temperature (tan delta peak) (° C.) | | 47 | 39 | | | |
| Elastic modulus, E', at 23° C. for cured film (megapascals) | | | | | | |
| 1ˢᵗ scan | | 789 | 356 | 268 | 675 | |
| 2ⁿᵈ scan | | | | 852 | 897 | |
| Elastic modulus, E', at 100° C. for cured film (megapascals) | | | | | | |
| 1ˢᵗ scan | | 76 | 18 | 733 | 683 | |
| 2ⁿᵈ scan | | | | 815 | 719 | |

Figure 8:
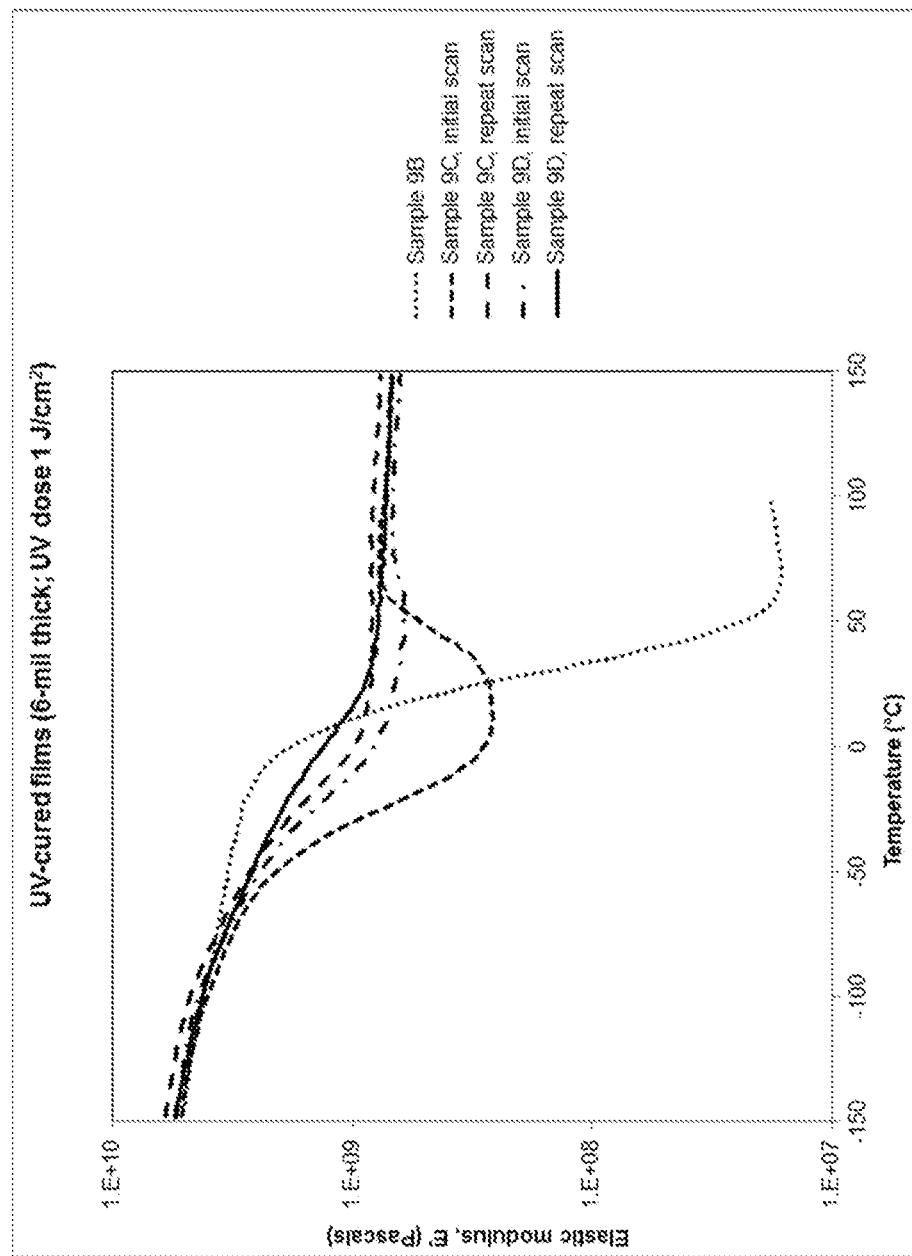
FIG. 8 shows the dynamic elastic modulus of cured films of non-silsesquioxane comparative reference Sample 9B and films of EP0409 glycidyl POSS silsesquioxane that have been cured using two different photoinitiator loadings.

FIG. 8 shows the dynamic elastic modulus of cured films of the reference Sample 9B in comparison with inventive Samples 9C and 9D that are based on EP0409 glycidyl POSS cage mixture (an epoxy functionalized silsesquioxane) that was formulated and cured using two different cationic photoinitiator loadings. Again, the POSS-based formulations showed tremendous increase in equilibrium modulus. Films were cured at 1 J/cm² and again were tested using an oscillatory frequency of 1 rad/sec. As initially prepared, the films were found to be undercured. Heating to a temperature of 150° C. during the initial scan helped to advance the cure, further raising the modulus, as shown in the data of repeated scans of the same films. Such phenomenon is known to occur with UV-cured epoxies. It suggests that, if the coating is applied on a draw tower and is not immediately well-cured upon UV exposure, then the cure process may benefit by including a thermal-cure step following the UV-irradiation exposure. This can be done online during drawing using a thermal oven or an oven that is irradiated with radio frequency radiation or microwave radiation.

Example 10

This example was conducted to demonstrate optical fibers produced using UV-curable PSQ-based coatings and to demonstrate that FBGs and FBG arrays could be written using the coatings. Table 9 shows a comparative sample (Sample 10A) and an inventive sample where the coating includes PSQ (Sample 10B). Viscosities of these two coatings were found to be 36,000 cP and 14,500 cP, respectively, as measured using a Brookfield DV-II digital viscometer with a TC-501 circulating water bath for temperature control, a small sample adaptor with an SC4-13R removable chamber and an SC4-21 cylindrical spindle.

Fibers were drawn using the two different coatings, using a single-core single-mode preform as a model for the downstream multicore shape-sensor application. The fiber numerical aperture (NA) was 0.21 and the nominal fiber geometry included a 125 micrometer glass cladding with a 185 micrometer coating diameter. The fibers were drawn on the same draw tower using identical process recipes (in particular, the same coating die sizes, UV lamp settings and draw speed). Fibers were evaluated regarding capability for writing FBG arrays into the fiber core through the coating using single laser pulses at a wavelength of 248 nm. Grating strength and yield were assessed using phase and amplitude criteria for FBG arrays that were about 20 meters in overall length. The fiber with coating Sample 10B produced no line defects (linear surface defects) in comparison with the fiber with coating Sample 10A, which displayed many catastrophic defects, when drawn under the same conditions. The use of fiber with coating Sample 10B resulted in a FBG yield of 96.4% for the inventive coating in comparison with 84.4% from the Sample 10A comparative coating.

TABLE 9

| | Sample 10A | Sample 10B |
|---|---|---|
| UrAcr Oligomer | 96.00 | 68.00 |
| Tripropyleneglycol diacrylate (TPDGA) | 3.88 | 1.94 |
| Irgacure 819 | 0.12 | 0.06 |
| MA0736 acrylo POSS cage mixture | | 30.00 |
| Viscosity at 25° C. (centipoise) | 36,000 | 14,500 |
| Single-pulse single-core FBG strength (dB) | 29.7 | 28 |
| Single-pulse single-core FBG array catastrophic "line" defects | Many | 0 |
| Single-pulse single-core FBG array yield | 84.4% | 96.4% |

Other fibers were drawn using the Sample 10A and 10B formulations at two different draw locations, using other preforms, and with several modified draw process recipes (other die sizes, UV lamp conditions, and draw speeds). In some cases, the photoinitiator concentration was altered, within the range 0.06-0.2 wt %. In FBG writing trials, the grating quality yield using the PSQ-modified coatings was found to be equal to or better than using the comparative coatings.

A successive laser energy method was also used to write FBGs, wherein the laser intensity was applied for an exposure duration of about 2 minutes, rather than in a single pulse. In this example, the preform had a numerical aperture (NA) of 0.27. Gratings were written through the coatings into the glass fiber by first passing the UV beam through a phase mask, thus creating a periodic refractive index modulation in the single-mode fiber core (using a period of about 0.5 micrometers to create a reflective grating at a wavelength of about 1550 nanometers). The UV energy density was chosen such that it did not damage the coating. Writing conditions used a 60 Hertz laser pulse at a wavelength of 248 nanometers, diffused over a 10 millimeter uniform grating length with a laser energy density of about 25 millijoules per square centimeter on the fiber. A grating was written into this fiber having a strength of 4.7 dB, which confirmed that multi-pulse gratings may be written through the PSQ-modified coatings. In this case, the grating strength was slightly lower with the PSQ-modified coating than for previous similar FBGs using the comparative coating AHF116, and this is possibly attributable to slightly higher UV absorbance.

Fibers with coating Samples 10A and 10B were examined for thermal resistance by measuring coating weight loss following a 24-hour isothermal exposure of 200° C. The fiber with Sample 10A lost 44% of its coating weight, in comparison with a lesser (26%) weight loss from fiber with coating Sample 10B.

Fiber was also drawn with coating Sample 9E, which utilized EP0409 glycidoxy POSS cage mixture and approximately 0.5 weight percent photoinitiator. At a sufficiently high draw speed, the coating flowed and coated the glass fiber satisfactorily (uniformly) but was slightly tacky as-drawn. The coating was partially cured using UV lamp exposures followed by passage through a mild thermal oven (100-200° C.). When the draw speed was slowed to increase UV dose and to increase the cure level, the coating became beaded. This was attributed to relatively low viscosity; it is known that the processing difficulty can be overcome through various tactics, including for example i) increasing the speed and degree of cure by increasing the photoinitiator level, ii) increasing the number and intensity of UV lamps, iii) further post-treating the partially cured coating using a thermal oven (either on-line during draw or post draw), and iv) increasing the viscosity of the coating by modifications to the formulation.

Example 11

Figure 9:
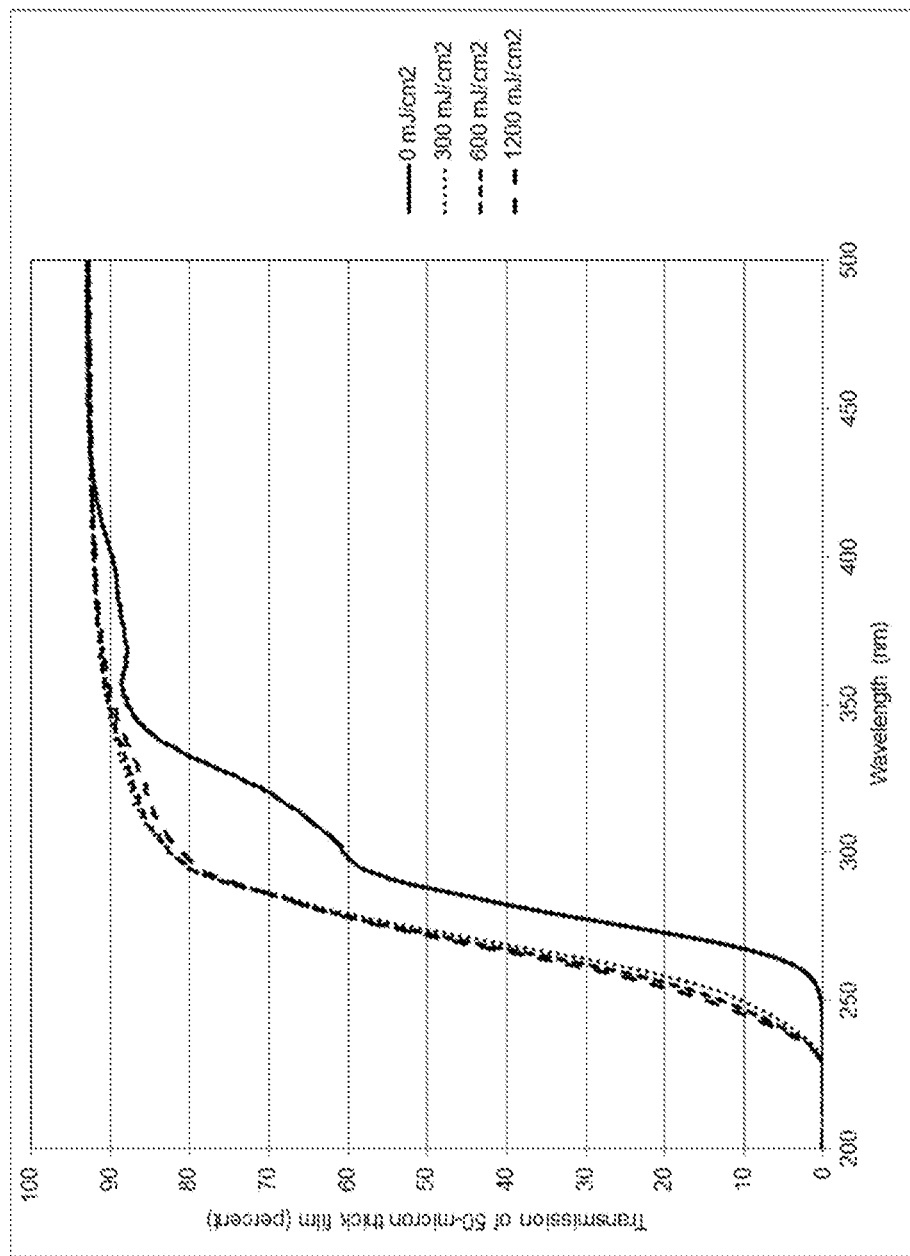
FIG. 9 shows UV transmission spectra for a 50 micrometer thick film of Sample 11C sandwiched between quartz plates for the uncured liquid and for the film after successive UV exposures in the range 300 to 1200 millijoules per square centimeter, where Sample 11C is based on UV-curable polysilsesquioxane comprising a mixture of skeletal types.

These examples demonstrate key optical and mechanical characteristics of selected commercial polysilsesquioxanes having a mixture of PSQ structures, including random and ladder types. A series of UV-curable components were identified as being available from Toagosei (http://www-.toagosei.co.jp/english/products/advanced/novel_material/sq_series.html). The series included free-radical curable grades having acrylate functional groups (AC-SQ TA-100 and AC-SQ SI-20) that were substantially solvent free. The series also included cationically curable grades based on oxetanyl functional groups (OX-SQ TX-100; OX-SQ SI-20; and OX-SQ ME-20) that were also substantially solvent free. Many of the grades were available with viscosities in the range 3,000 to 50,000 centipoise at 25° C. and with refractive index values before cure of greater than or equal to 1.46, making them attractive candidates for formulation of optical fiber coatings. Samples of AC-SQ TA-100 and AC-SQ SI-20 were obtained and were used to prepare UV-cured films as in the Table 10. Samples 11A and 11B produced films with high hardness; these were not tested for UV transparency due to the high photoinitiator loadings. Sample 11C was formulated using 70 weight percent AC-SQ TA-100 together with 30 weight percent of a diluent monomer, ethoxyethoxyethyl acrylate (EEEA), that is known to have a low glass transition temperature (−70° C.) and can act as a flexibilizer. Sample 11C was cured by using 0.2 parts of Irgacure 819 photoinitiator per hundred parts of resin (phr). Sample 11C cured readily using this low photoinitiator level and produced films having good UV transparency (up to 35% transmission at 248 nm wavelength for a 25 micrometer thick film cured using a UV dose of 1.2 joules per centimeter squared), as summarized in the Table 10. The UV transmission spectra of a 50 micrometer thick film of Sample 11C sandwiched between quartz plates are shown in FIG. 9 for the uncured liquid and for the film after successive UV exposures in the range 300 to 1200 millijoules per square centimeter.

TABLE 10

| | | Sample 11A | Sample 11B | Sample 11C |
|---|---|---|---|---|
| AC-SQ TA-100 | wt. % | 97 | | 70 |
| AC-SQ SI-20 | wt. % | | 97 | |
| 2-(2-Ethoxyethoxy)ethyl Acrylate monomer | wt. % | | | 30 |
| Irgacure 1173 photoinitiator (BASF) | wt. % | 3 | 3 | |
| Irgacure 819 photoinitiator (BASF) | phr | | | 0.2 |
| Elastic modulus, E', at 0° C. | pascals | $1 \times 10^9$ | $2 \times 10^9$ | |
| Elastic modulus, E', at 150° C. | pascals | $1 \times 10^9$ | $8 \times 10^8$ | |
| Coefficient of thermal expansion at 30 to 250° C. | ppm/° C. | 80 | 120 | |
| Refractive index | | 1.51 | 1.49 | |
| Water absorption after immersion in water at 23° C. for 24 hours | % | 1.09 | 1.02 | |
| Thermogravimetric weight loss temperature for 5% weight loss in air (heating rate 20° C./min) | ° C. | 360 | 340 | |
| Volume change upon UV exposure (100 mW, 30 seconds) | % | −5.5 | −4.0 | |
| Optical transmission of film at 248 nm wavelength, 25 micrometers thick, before and after UV exposure | | | | |
| Uncured | % | | | 32.2 |
| 300 millijoules percentimeter squared | % | | | 34.3 |
| 1200 millijoules percentimeter squared | % | | | 35.5 |
| Optical transmission of film at 248 nm wavelength, 50 micrometers thick, before and after UV exposure | | | | |
| Uncured | % | | | 0.24 |
| 300 millijoules percentimeter squared | % | | | 8.80 |
| 1200 millijoules percentimeter squared | % | | | 12.85 |

On balance, the data tend to confirm that POSS-based silsesquioxane coatings can provide enhancements with respect to some combination of performance attributes, such as UV transparency, thermal stability, coating hardness and resistance to abrasion.

While this disclosure describes exemplary embodiments, it will be understood by those skilled in the art that various changes can be made and equivalents can be substituted for elements thereof without departing from the scope of the disclosed embodiments. In addition, many modifications can be made to adapt a particular situation or material to the teachings of this disclosure without departing from the essential scope thereof. Therefore, it is intended that this disclosure not be limited to the particular embodiments disclosed as the best mode contemplated for carrying out this disclosure.

What is claimed is:

1. A coated article comprising:
the reaction product of a coating composition comprising a polyhedral cage silsesquioxane component having one or more reactive functional groups that render it curable using ultraviolet radiation; where the one or more reactive functional groups are acrylates; and
optionally, a co-reactive non-silsesquioxane monomer and/or an oligomer having one or more reactive functional groups that are curable using ultraviolet radiation and are free radically curable acrylate; where the coating composition is disposed and cured on an optical article to form the coating; where the optical article is at least one of an optical fiber or an optical planar waveguide; and where the average functionality of the coating composition is greater than one.

2. The coated article of claim 1, where either the acrylate functionalized polyhedral cage silsesquioxane component, the free radically curable acrylates or both the acrylate functionalized polyhedral cage silsesquioxane component and the free radically curable acrylates have non-acrylate co-reactive components, where the non-acrylate co-reactive components are selected from the group consisting of methacrylates, vinyls, vinyl ethers, and thiols.

3. The coated article of claim 1, where the silsesquioxane has the structure(s) illustrated in Formula 3a, Formula 3b:

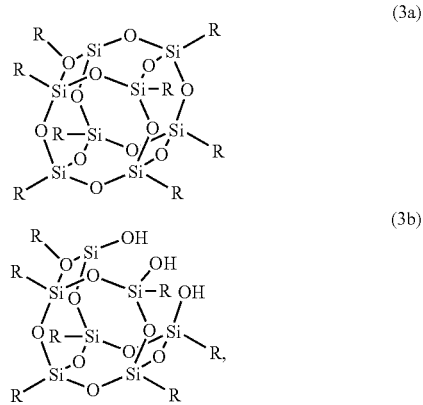

or a combination thereof; where R is a reactive functional group or is a non-reactive group that facilitates chemical compatibilization with other species present in the composition; and where each R can independently be the same or different.

4. The coated article of claim 3, where the non-reactive groups include $C_1$-$C_{24}$ straight, branched, or cyclic alkyls, aliphatic of cycloaliphatic ethers or polyethers, aliphatic or cycloaliphatic esters or polyesters, aliphatic or cycloaliphatic siloxanes or polysiloxanes, aliphatic or cycloaliphatic carbonates or polycarbonates, aliphatic or cycloaliphatic fluorocarbons, halocarbons, aliphatic or cycloaliphatic urethane ethers, urethane esters, or urethane carbonates.

5. The coated article of claim 3, where the reactive functional groups are disposed on a homopolymer or copolymer along a chain backbone of or alternatively located as a pendant group off of the backbone.

6. The coated article of claim 1, where a cured coating is non-toxic and biocompatible.

7. The coated article of claim 1, where the polyhedral silsesquioxane is selected from the group consisting of an acryloisobutyl silsesquioxane, acrylo silsesquioxane cage mixture, isobutyl acrylate difunctional polyhedral heterocage silsesquioxane, isooctyl acrylate difunctional polyhedral heterocage silsesquioxane or a combination thereof.

8. The coated article of claim 1, where the coating composition has a viscosity of 1.000 to 40,000 centipoise at 25° C.

9. The coated article of claim 1, further comprising a photoinitiator.

10. The coated article of claim 1, further comprising a silane coupling agent.

11. The coated article of claim 1, where the free radically curable acrylate functionalized non-silsesquioxane component is a polyurethane acrylate.

12. The coated article of claim 1, where the coating composition has an average combined reactive functionality of greater than 2.

13. The coated article of claim 1, where the coating composition has a UV transmission at a wavelength of 248 nm that is greater than 15% at a thickness of 25 micrometers, a UV absorbance that is less than 0.8 at a thickness of 25 micrometers and a wavelength of 248 nm or an optical absorbance that is less than 0.032/μm.

14. The coated article of claim 13, where the UV absorbance is less than 0.02/μm at a wavelength of 248 nm.

15. The coated article of claim 13, where the UV absorbance is less than 0.01/μm at a wavelength of 248 nm.

16. The coating article of claim 1, wherein the silsesquioxane component comprises polyhedral cage polysilsesquioxane that have a mixture of 8, 10 and 12 functional groups.

17. The coated article of claim 1, where the coating composition has a UV transmission of greater than 10% at a thickness of 25 micrometers and a wavelength of 248 nm, a UV absorbance of less than 1 at a thickness of 25 micrometers and a wavelength of 248 nm, or an optical absorbance less than 0.04/μm.

18. A coated article comprising:
the reaction product of a coating composition comprising a polyhedral cage silsesquioxane component having one or more reactive functional groups that render it curable using ultraviolet radiation;
where the one or more reactive functional group is an acrylate; and
optionally, a co-reactive non-silsesquioxane monomer and/or an oligomer having one or more reactive functional groups that are curable using ultraviolet radiation and wherein the reactive functional group is a free radically curable acrylate; where the coating composition is disposed and cured on an optical article to form the coating; where the optical article is at least one of an optical fiber or an optical planar waveguide.

19. The coated article of claim 18, where the coating is disposed onto an optical fiber in a thickness of 5 to 82.5 micrometers.

20. The coated article of claim 18, where the coating has an optical absorbance of less than 0.04/μm at a UV wavelength of 248 nm.

21. The coated article of claim 18, where the coating has a refractive index of about 1.48 to about 1.50.

22. The coated article of claim 18, where the coating is an acrylate-based formulation having an elastic modulus of 20 to 100 MPa at 100° C.

23. The coated article of claim 18, where the coating displays an elongation to break of greater than 15% and an elastic modulus at 23° C. of 300 to 1200 MPa.

24. A method comprising:
   disposing onto an optical fiber or onto an optical waveguide a composition comprising:
   a polyhedral cage silsesquioxane component having one or more reactive functional groups that render it curable using ultraviolet radiation; where the reactive functional group is an acrylate; and
   optionally, a co-reactive non-silsesquioxane monomer and/or an oligomer having one or more reactive functional groups that are curable using ultraviolet radiation and wherein the functional group is a free radically curable acrylate; where the coating composition is cured on the optical fiber or the optical waveguide, where the average functionality of the silsesquioxane component and the co-reactive non-silsesquioxane monomer prior to curing is greater than one; and
   curing the composition using ultraviolet radiation to produce a coating that displays an optical absorbance capability of less than 0.04 per micrometer at an ultraviolet wavelength of 248 nm; wherein the coating displays an elongation to break of greater than 15% and an elastic modulus at 23° C. of 300 to 1200 MPa.

25. The method of claim 24, further comprising writing a Bragg grating into the optical fiber or into the optical planar waveguide.

26. The method of claim 24, further comprising writing a Bragg grating into the optical fiber or into the optical planar waveguide using a single laser pulse.

* * * * *